United States Patent [19]

Obu et al.

[11] Patent Number: 5,208,612
[45] Date of Patent: May 4, 1993

[54] IMAGE RECORDING APPARATUS CONSTITUTING OF SELECTABLE UNITS

[75] Inventors: Makoto Obu; Minoru Suzuki, both of Yokohama; Koichi Noguchi, Tokyo; Takashi Mori, Tokyo; Akira Ishida, Tokyo; Koichiro Jinnai, Kawasaki, all of Japan

[73] Assignee: Ricoh Company, Ltd., Tokyo, Japan

[21] Appl. No.: 623,683

[22] Filed: Dec. 6, 1990

[30] Foreign Application Priority Data

| Dec. 6, 1989 | [JP] | Japan | 1-315346 |
| Dec. 28, 1989 | [JP] | Japan | 1-338638 |
| Mar. 16, 1990 | [JP] | Japan | 2-64271 |
| Mar. 16, 1990 | [JP] | Japan | 2-64272 |
| Mar. 16, 1990 | [JP] | Japan | 2-64273 |
| Mar. 16, 1990 | [JP] | Japan | 2-64274 |
| Mar. 27, 1990 | [JP] | Japan | 2-75397 |
| Mar. 27, 1990 | [JP] | Japan | 2-75398 |
| May 14, 1990 | [JP] | Japan | 2-121211 |
| Sep. 5, 1990 | [JP] | Japan | 2-234753 |

[51] Int. Cl.⁵ .............................. C01D 15/06
[52] U.S. Cl. ..................... 346/153.1; 346/160; 346/108; 346/157; 346/160.1; 355/27; 355/200; 355/326
[58] Field of Search ............. 346/153.1, 160, 160.1, 346/107 R, 108, 157; 355/200, 326, 27

[56] References Cited

U.S. PATENT DOCUMENTS

| 3,966,199 | 6/1976 | Silverberg | 271/275 X |
| 4,538,896 | 9/1985 | Tajima et al. | 355/200 |
| 4,563,076 | 1/1986 | Takahashi et al. | 355/200 |
| 4,563,078 | 1/1986 | Fantuzzo et al. | 355/200 |
| 4,588,280 | 5/1986 | Ogawa et al. | 355/200 |
| 4,605,299 | 8/1986 | Mochimaru | 355/200 |
| 4,764,792 | 8/1988 | Ducos et al. | 355/27 |
| 4,785,319 | 11/1988 | Fujino et al. | 346/160 |
| 4,814,817 | 3/1989 | Nishijima et al. | 355/200 |
| 4,873,548 | 10/1989 | Kobayashi et al. | 355/200 |
| 4,901,110 | 2/1990 | Tompkins et al. | 355/326 X |
| 4,916,547 | 4/1990 | Katsumata et al. | 358/300 |
| 4,965,633 | 10/1990 | Surti | 355/200 |
| 4,975,744 | 12/1990 | Ebata et al. | 355/200 X |
| 5,018,640 | 5/1991 | Morofuji | 346/153.1 X |
| 5,027,158 | 6/1991 | Tompkins et al. | 355/271 |
| 5,065,183 | 11/1991 | Morofuji et al. | 355/326 X |

FOREIGN PATENT DOCUMENTS

| 2041830 | 9/1980 | United Kingdom . |
| 2177976 | 2/1987 | United Kingdom . |
| 2197258 | 5/1988 | United Kingdom . |
| WO84/03972 | 10/1984 | World Int. Prop. O. . |

Primary Examiner—Benjamin R. Fuller
Assistant Examiner—Randy W. Gibson
Attorney, Agent, or Firm—Oblon, Spivak, McClelland, Maier & Neustadt

[57] ABSTRACT

A copier, printer, facsimile apparatus or similar image forming apparatus made up of components each being constructed into a unit and connected to the others by external arrangements. The apparatus has a base unit accommodating an electric control device, a paper feeding unit removably mounted on the base unit, and an image forming unit for forming an image and recording it on a paper sheet. The base unit, paper feeding unit, and image forming unit may be combined in any desired configuration to construct an image recording apparatus capable of performing any desired kind of image forming procedure.

14 Claims, 37 Drawing Sheets

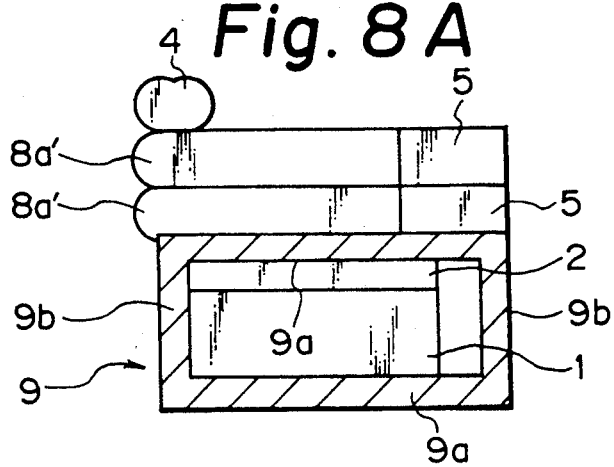
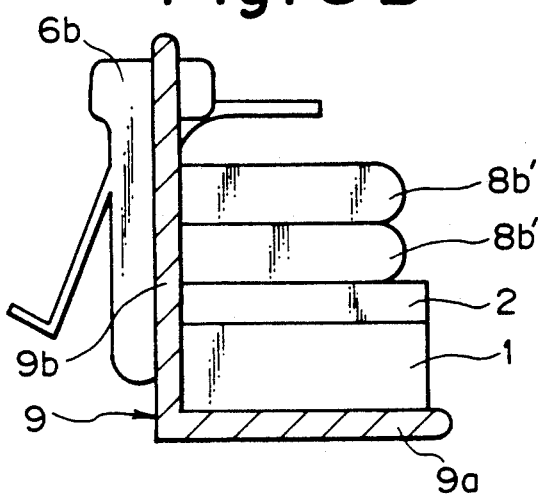
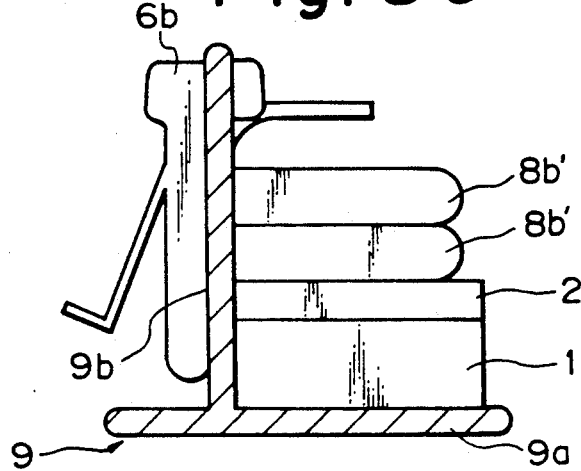

IMAGE RECORDING APPARATUS CONSTITUTING OF SELECTABLE UNITS

BACKGROUND OF THE INVENTION

The present invention relates to a printer, copier, facsimile transceiver or similar image recording apparatus and, more particularly, an image recording apparatus having various modular components each being constructed into a unit and operatively connected together by external arrangements.

Image recording apparatuses such as copiers, printers and facsimile transceivers are implemented with various kinds of image forming principles or systems. Typical of image forming systems are an electrophotographic system, a thermal printing system, and an ink jet printing system. Further, each of such systems forms black-and-white images and color images by using exclusive apparatuses. It has been customary to produce apparatuses for implementing the various image forming systems independently of one another. For example, when both of the ink jet printing system and the thermal printing system are desired, at least two exclusive printers have to be prepared. When a person having a black-and-white printer desires color printing, the person has to purchase a color printer or to replace the black-and-white printer with a printer having black-and-white and color printing capabilities. This not only increases the user's expenditure but also requires the manufacturers to produced various kinds of printers at all times.

An image recording apparatus may have a part thereof, e.g., a developing device or an image forming device including a developing device and a photoconductive element constructed into a replaceable unit, as disclosed in Japanese Patent Publication No. 20832/1989 and Japanese patent Laid-Open Publication Nos. 99861/1984 and 273057/1989 by way of example. This is successful in promoting easy replacement of expendables and replacement of analog and digital image forming systems. However, since such a replaceable unit scheme does not change the physical appearance of the apparatus, the functions available with the apparatus cannot be extended beyond a certain limit. In addition, since the change in the internal arrangement of the apparatus cannot be observed from the outside, an undesired kind of printing is apt to occur.

SUMMARY OF THE INVENTION

It is therefore an object of the present invention to provide an image apparatus recording apparatus having selectable modular units and extremely great extendibility.

It is another object of the present invention to provide an image recording apparatus having selectable units and implementing the functions of various types of image recording apparatuses with a minimum of cost and space.

It is another object of the present invention to provide an image recording apparatus having selectable units and readily replacing a black-and-white recording function with a color recording function when a few components are additionally incorporated.

An image recording apparatus constituted by components each being constructed into a unit of the present invention comprises a base unit comprising a single casing accommodating at least an electric control device, a paper feeding unit removably mounted on the base unit, and an image forming unit comprising a single casing accommodating image processing means for forming an image in response to an image signal which is representative of an image to be recorded. The image forming unit is removably connected to the base unit and operated by the electric control device of the base unit.

BRIEF DESCRIPTION OF THE DRAWINGS

The above and other objects, features and advantages of the present invention will become more apparent from the following detailed description taken with the accompanying drawings in which:

FIGS. 8A to 8F are views each showing a specific arrangement of the units and frames shown in FIGS. 7F and 7K;

DESCRIPTION OF THE PREFERRED EMBODIMENTS

Figure 1:
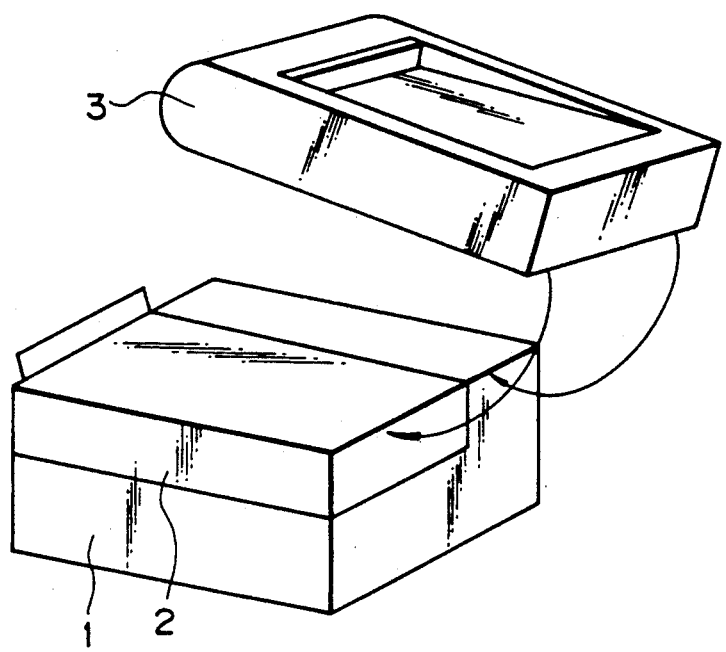
FIG. 1 is an exploded perspective view of the basic structure of an image recording apparatus in accordance with the present invention.
Figure 2:
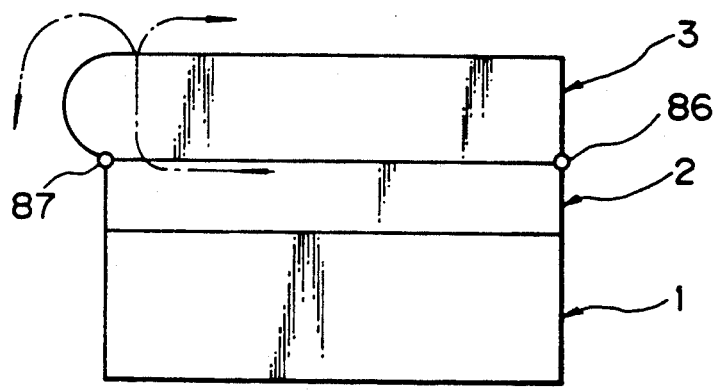
FIG. 2 is a front view showing the apparatus of FIG. 1 in an assembled condition.

Any type of image recording apparatus basically has a paper feeding section loaded with paper sheets, an image forming section for recording images on the paper sheets fed one by one from the paper feeding section, and an electrical control section for controlling the paper feeding section and image forming section. In accordance with the present invention, as shown in FIG. 1, an image recording apparatus is made up of a base unit 1 having a single casing incorporating the electrical control section and, if necessary, a mechanical drive arrangement, a paper feeding unit 2 built in the base unit 1, and an image forming unit 3 having a single casing in which the image forming section is accommodated. The base unit 1 and the image forming unit 3 are removably connected to each other. Specially, as shown in FIG. 2, one can readily complete the image forming apparatus by stacking the base unit 1 and image forming unit 3 as independent units and connecting them by joints 86 and 87 or by placing them side by side. Exclusive image forming units 3 each being assigned to a particular image forming system such as an electrophotographic system or a thermomagnetic writing system, ink jet printing system, thermal printing system or wire dot printing system may be prepared. Then, an image forming unit 3 capable of implementing a desired printing system can be associated with the base unit 1 to complete a different type of image recording apparatus. The electrophotographic system or the thermomagnetic writing system electrostatically forms a latent image on a photoconductive element or similar image carrier, develops the latent image by a toner or similar powdery developer, and then transfers the resulted toner image to a paper sheet, as well known in the art.

In FIGS. 1 and 2, the paper feeding unit 2 has a paper tray and a paper cassette built in the casing of the base unit 1. If desired, the paper feeding unit 2 may also be accommodated in a single casing and removably mounted on the base unit 1. Then, the feed of paper sheets from the unit 2 will be controlled from the base unit 1.

Figure 3:
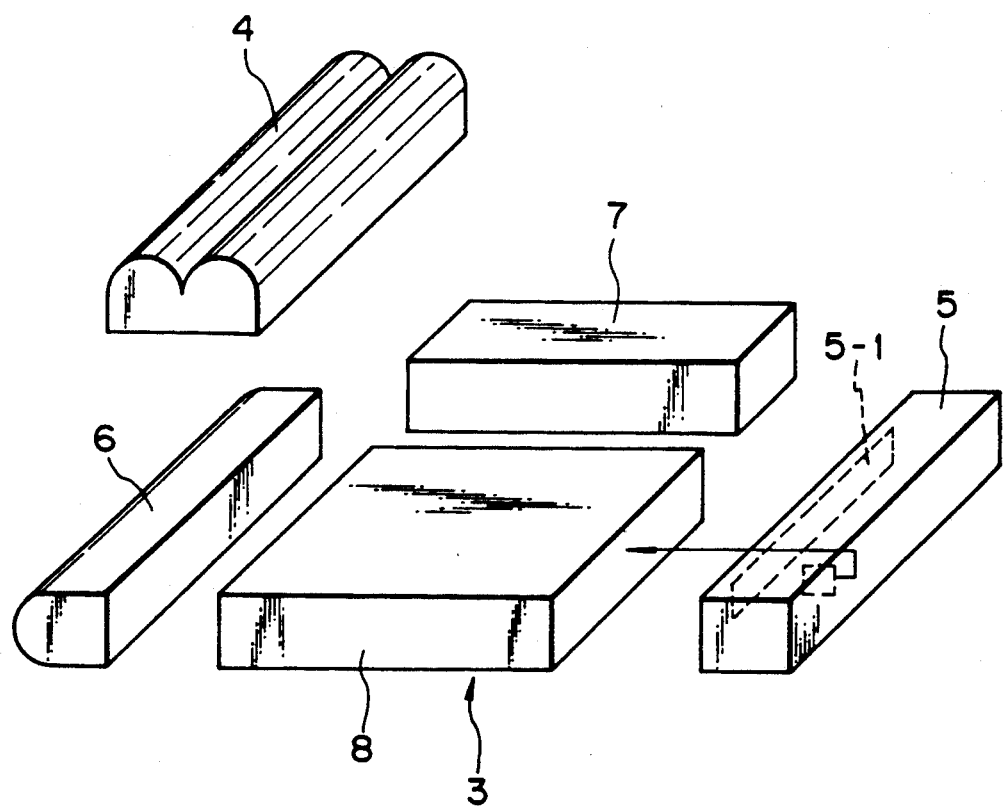
FIG. 3 is a perspective view of various separable units of devices constituting an image forming unit.

The image forming unit 3 has thereinside a writing device for writing an image in response to an image signal fed from another device, an image processing or image forming device for processing the written image such that they can be recorded on a paper sheet, a transporting device for transporting a paper sheet within the unit 3, a mechanical gearing for transmitting forces that mechanically drive rotatable members and other movable members, and, in some image forming system, a fixing device for fixing an image by a powdery developer. As shown in FIG. 3, the image forming unit 3 with devices or components may be subdivided into a fixing unit 4 accommodating the fixing device, a writing unit 5 accommodating the writing device and having an opening 5-1, a transporting unit 6 accommodating the transporting device, and a gearing unit 7 accommodating the mechanical gearing, each of the units 4 to 7 being provided with a removable casing. One or more or even all of the units 4 to 7 may be removably mounted on an image forming unit body 8 which has the image processing or image forming device thereinside. The writing unit 5 incorporates, for example, a rotatable polygonal mirror for steering a beam issuing from an He-Ne laser or semiconductor laser, a member for turning the beam on and off, an f-theta lens, and a mirror. The beam issuing from the laser is introduced into the image forming unit body 8 via the opening 5-1 of the casing of the writing unit 5, as indicated by an arrow in FIG. 3.

Figure 4A:
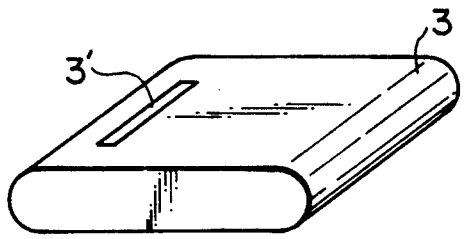
FIGS. 4A to 4N are perspective views each showing a specific configuration in which the units of the image forming unit may be combined.
Figure 4B:
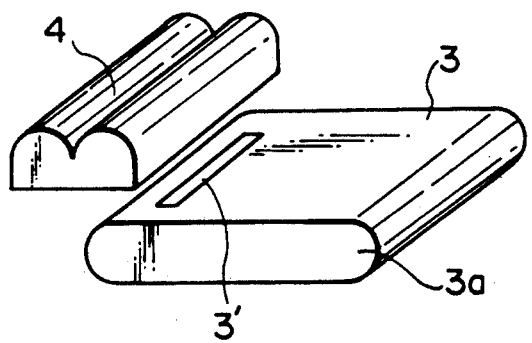
Figure 4C:
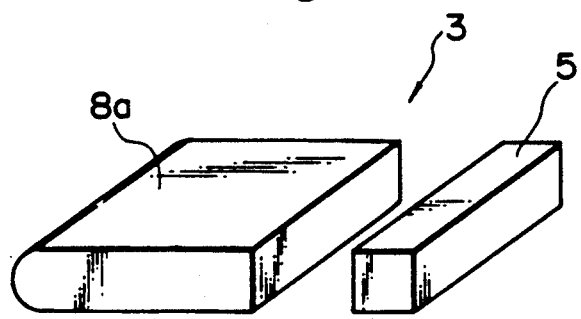
Figure 4D:
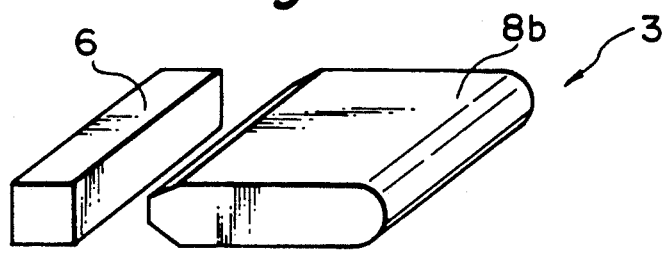
Figure 4E:
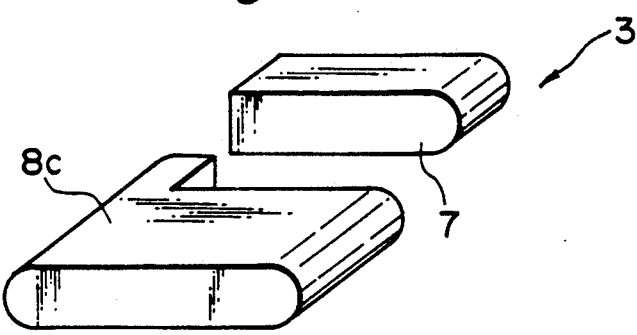
Figure 4F:
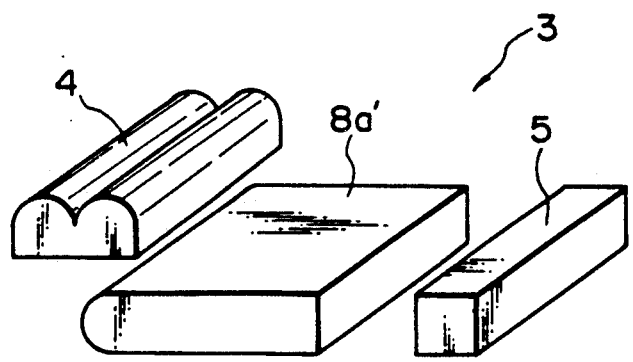
Figure 4G:
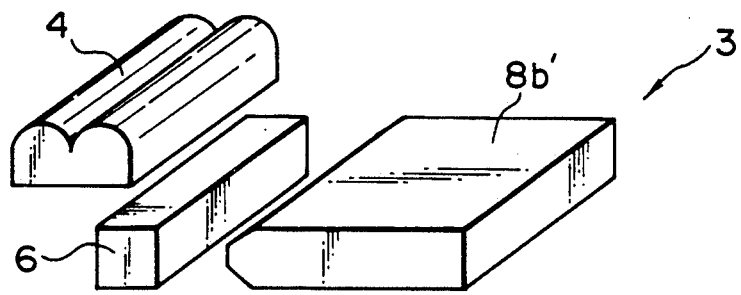
Figure 4H:
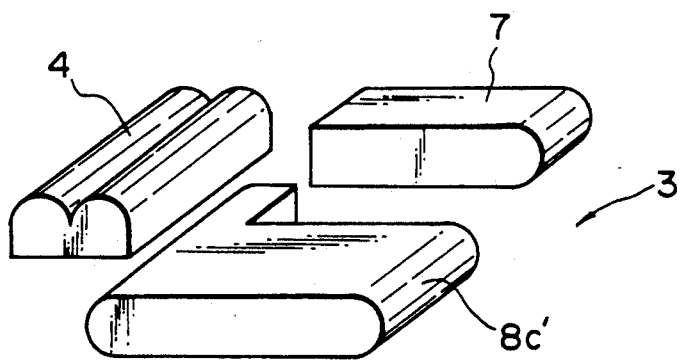
Figure 4I:
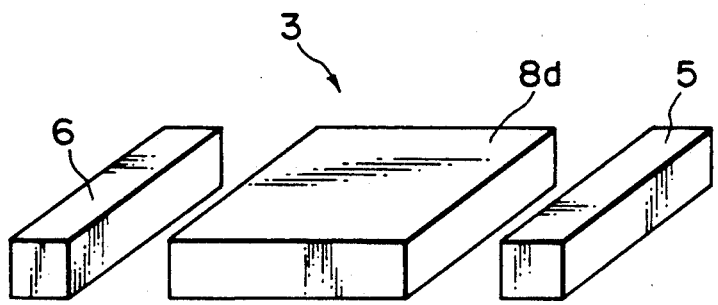
Figure 4J:
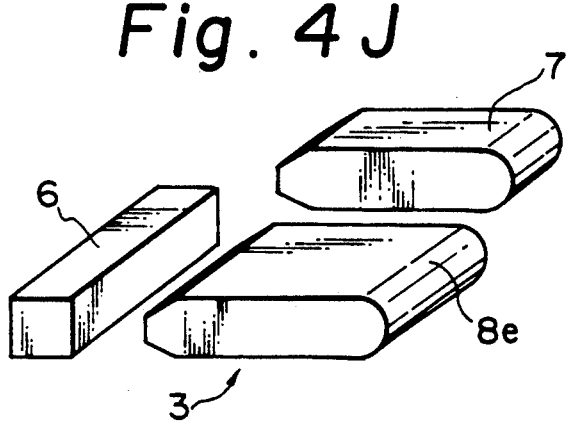
Figure 4K:
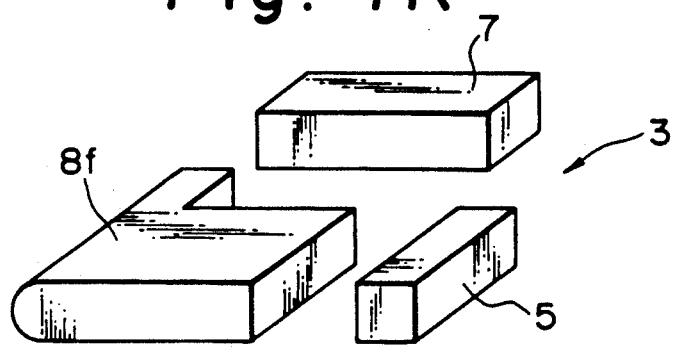
Figure 4L:
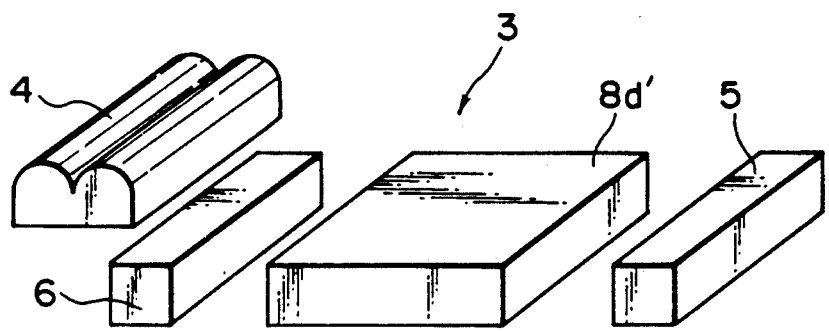
Figure 4M:
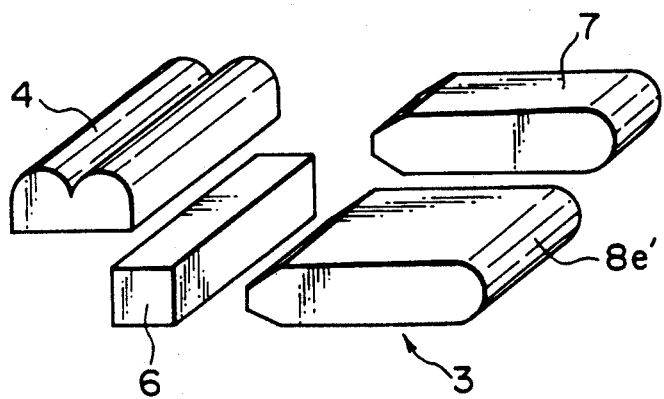
Figure 4N:
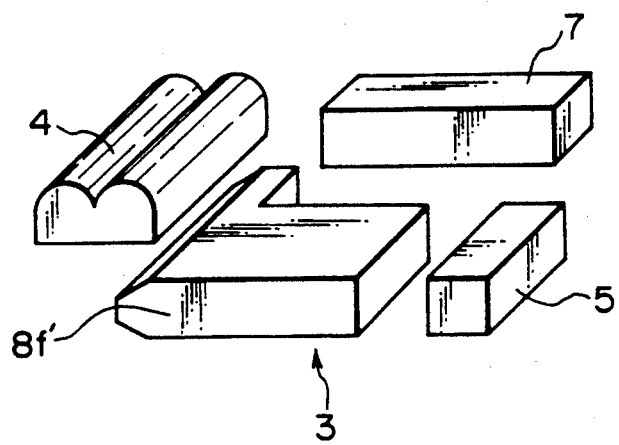

The image forming unit 3 may be subdivided and combined in various configurations, as shown in FIGS. 4A to 4N. It is to be noted that the configurations in these figures are shown in simplified forms to facilitate an understanding and not always identical with actual configurations.

Specifically, FIG. 4A shows the basic image forming unit 3 having a slot 3' through which a paper sheet passes. FIG. 4B shows a the image forming unit 3 together with the fixing unit 4 which is physically independent of the image forming unit 3. This configuration is applicable to an image forming system that needs a fixing device. The image forming unit 3 shown in FIG. 4B is implemented as a modified image forming unit 3a. When a plurality of image forming units 3 are arranged side by side to transfer different kinds of images one above another as in a color printer, the configuration of FIG. 4B allows the images to be fixed after all of them have been transferred to a paper sheet. In FIG. 4C, the writing unit 5 is separated from the image forming unit 3 and combined with a first image forming unit body 8a. In FIG. 4D, the transporting unit 6 is separated from the image forming unit 3 and combined with a second image forming unit body 8b. Likewise, FIG. 4E shows the gearing unit 7 independent of a third image forming unit body 8c. In FIGS. 4F, 4G and 4H, the fixing unit 4 is removably associated with, respectively, a modified first image forming unit body 8'a, a modified second image forming unit body 8'b and a modified third image forming unit body 8'c corresponding to the image forming unit bodies 8a, 8b and 8c, respectively. FIG. 4I shows the image forming unit 3 in which the writing unit 5 and transporting unit 6 are physically independently of a fourth image forming unit body 8d. FIG. 4J shows the image forming unit 3 in which the transporting unit 6 and gearing unit 7 are separated from a fifth image forming unit body 8e. FIG. 4K shows the image unit 3 in which the writing unit 5 and gearing unit 7 are separated from a sixth image forming unit body 8f.

Further, FIGS. 4L, 4M and 4N show the image forming units 3 each having the fixing unit associated with a modified fourth to a modified sixth image forming unit body 8'd to 8'f corresponding to the image forming bodies 8d to 8f, respectively.

Figure 5A:
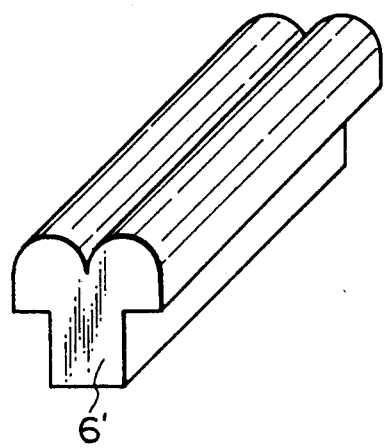
FIGS. 5A to 5D are perspective views each showing a specific configuration in which the units of the devices constituting the image forming unit may be constructed into a single unit.
Figure 5B:
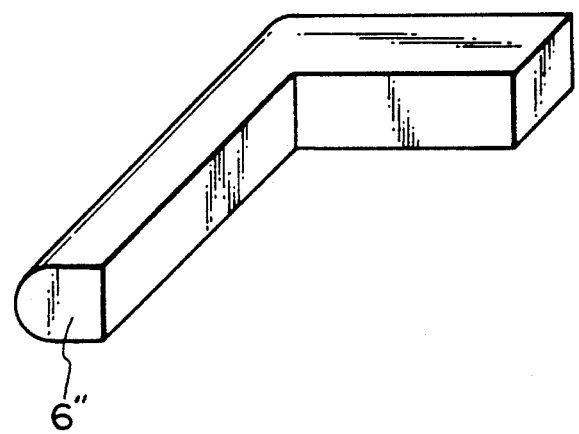
Figure 5C:
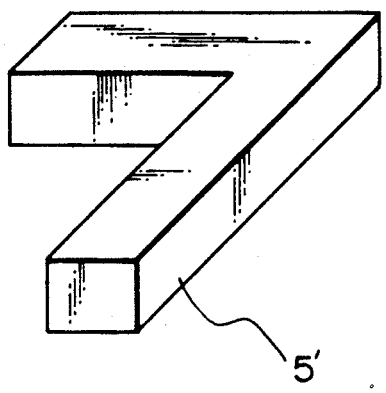
Figure 5D:
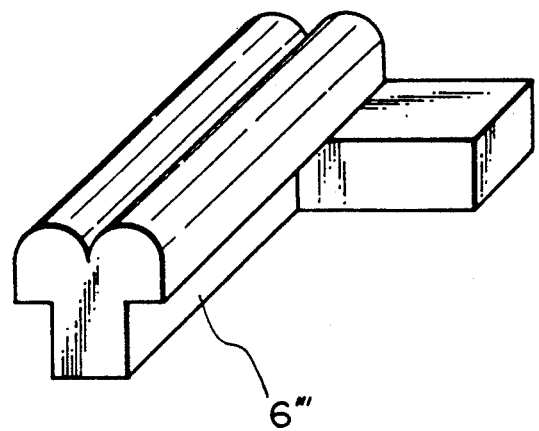

While FIGS. 4A to 4N each shows the individual separable components as being used independently of one another, some of them may be combined in a desired configuration. Specifically, FIG. 5A shows a transporting and fixing unit 6' made up of the transporting unit 6 and fixing unit 4. FIG. 5B shows a transporting and gearing unit 6'' which is an integral assembly of the transporting unit 6 and gearing unit 7. FIG. 5C shows a writing and gearing unit 5' made up of the writing unit 5 and gearing unit 7. It is to be noted that the specific configurations shown in FIGS. 5A to 5C are only illustrative and not limitative. FIG. 5D shows a transporting, fixing and gearing unit 6''' which is the combination of the fixing unit 4, transporting unit 6, and gearing unit 7.

Figure 6A:
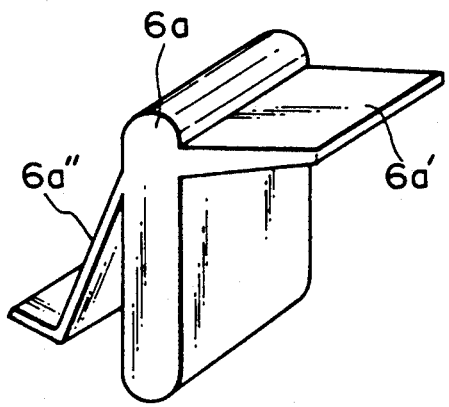
FIGS. 6A to 6C are perspective views showing a specific configuration in which a plurality of units of the same kind of the devices constituting the image forming unit may be constructed into a single unit.
Figure 6B:
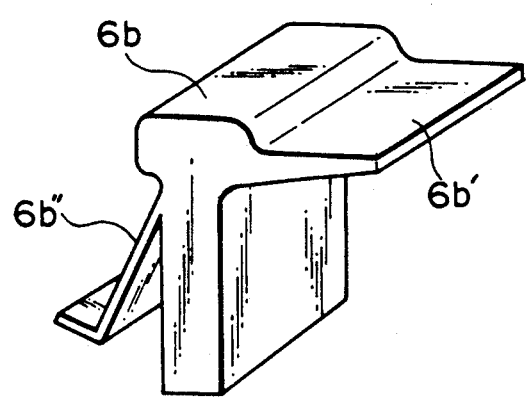
Figure 6C:
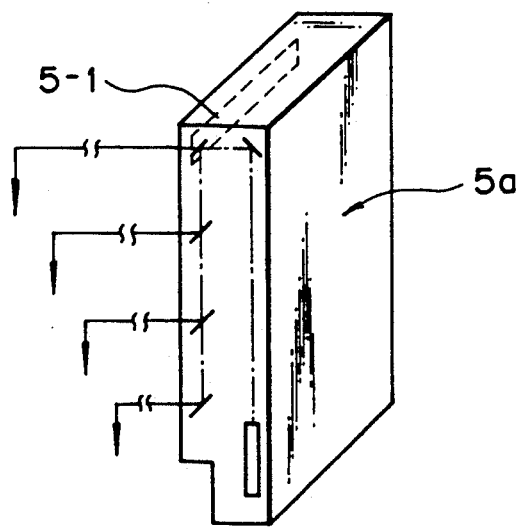

When the image forming apparatus is constituted by the base unit 1 and a plurality of image forming units 3 mounted on the base unit 1, corresponding ones of the subunits of the individual image forming units 3 may be united into a single unit and mounted on one or both of the image forming unit body and the base unit 1. Specifically, as shown in FIG. 6A, a plurality of transporting units may be combined to constitute a single multi-stage transporting unit 6a. The unit 6a has a top tray 6'a and a side tray 6''a which are formed integrally with each other or removably connected together, so that recorded sheets may be selectively discharged onto either one of the trays 6'a and 6''a. In FIG. 6B, the fixing unit 4 is provided integrally with the multi-stage transporting unit 6a, FIG. 6A, while trays 6'b and 6''b are formed in the same manner as in FIG. 6A. In Fig. C, a plurality of writing units 5 are constructed into a single multi-stage writing unit 5a which is to be shader by a plurality of image forming units 3. The writing unit 5a may be provided with a plurality of openings 5-1 to emit laser beams at positions corresponding to the image forming units 3. Specifically, the openings 5-1 are formed in the individual image forming units 3 at the time of assembly, so that image light may reach a particular image forming unit 3 via associated one of the openings 5-1.

Figure 7A:
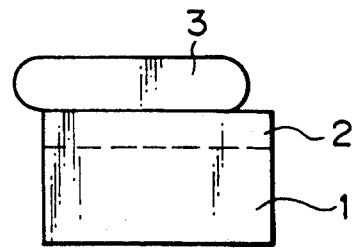
FIGS. 7A to 7N are views each showing a specific configuration in which various units constituting an image recording apparatus of the present invention may be combined.
Figure 7B:
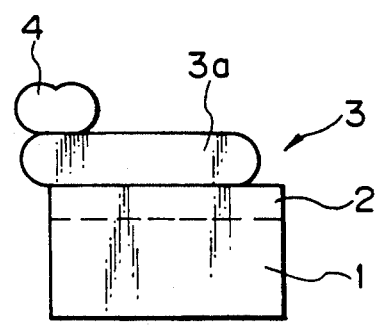
Figure 7C:
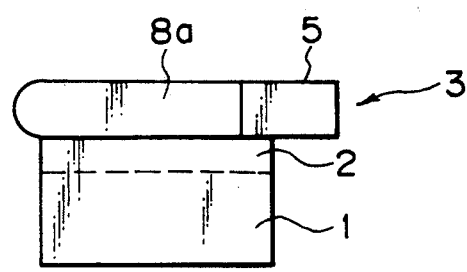
Figure 7D:
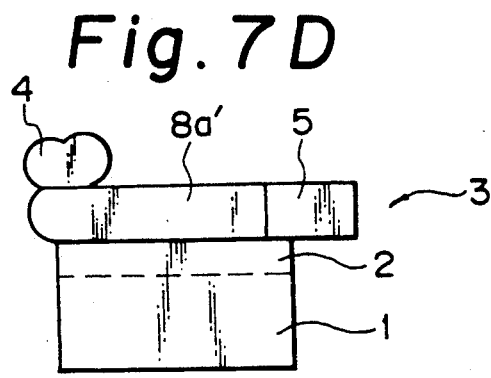
Figure 7E:
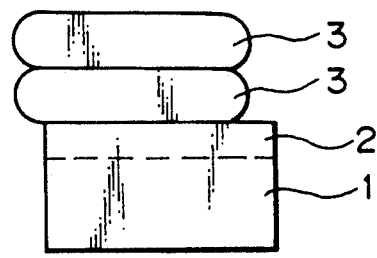
Figure 7F:
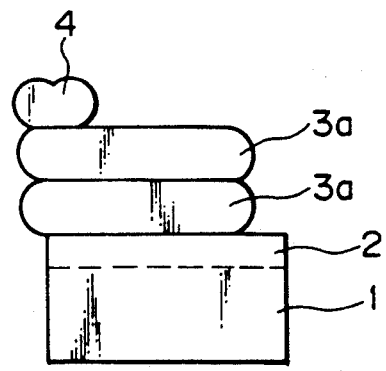
Figure 7G:
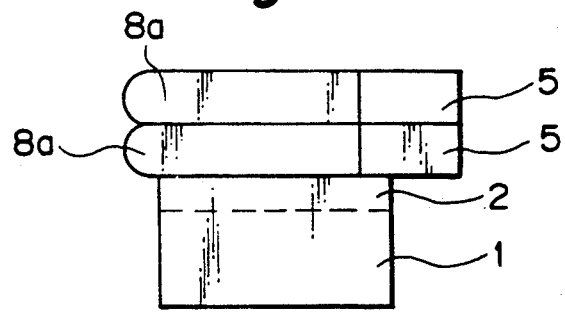
Figure 7H:
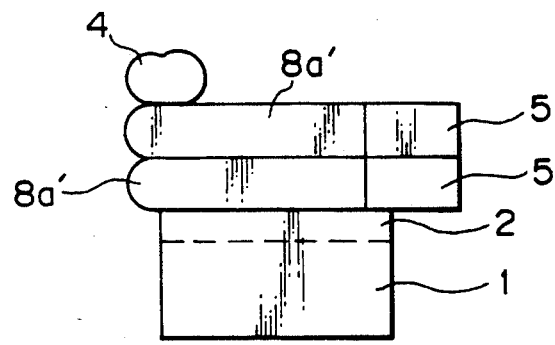
Figure 7I:
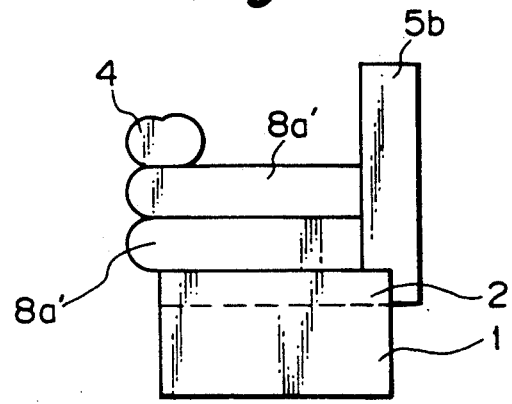
Figure 7J:
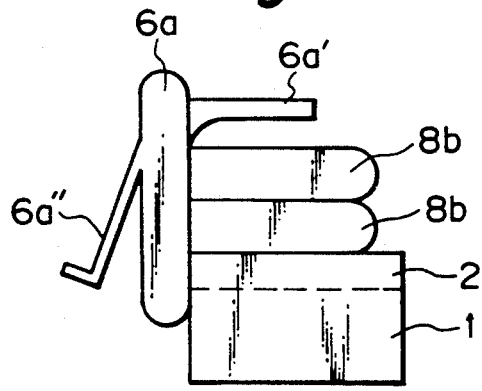
Figure 7K:
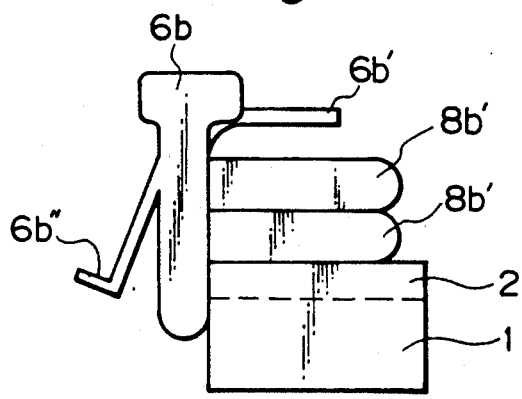
Figure 7L:
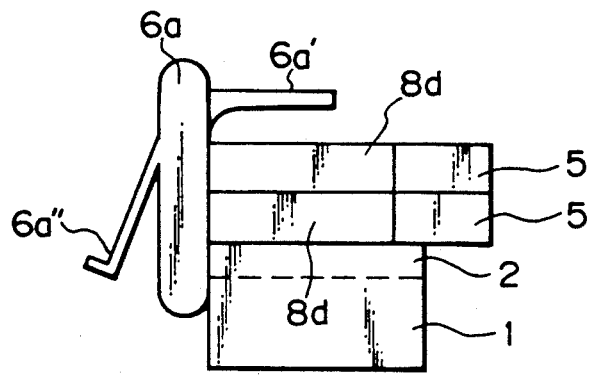
Figure 7M:
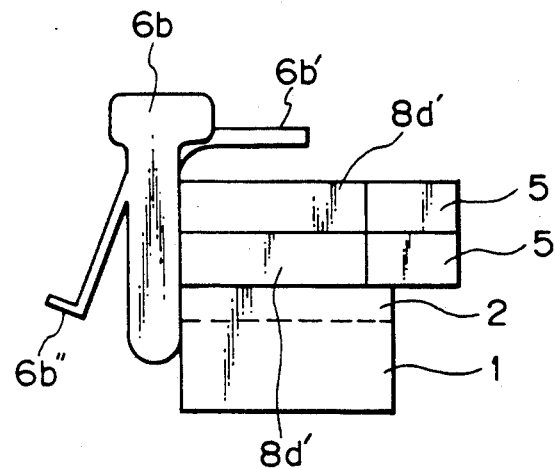
Figure 7N:
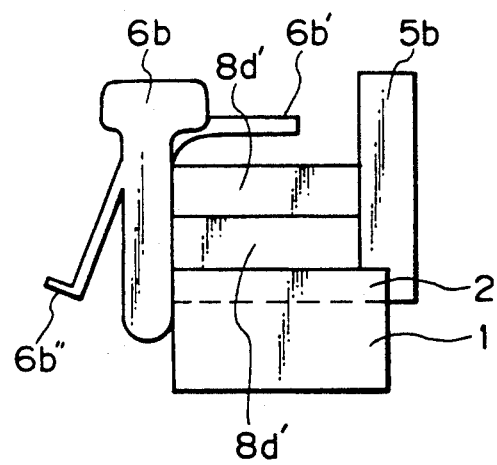

FIGS. 7A to 7N depict typical combinations of the units 1 to 3, FIGS. 1 and 2, which are allowable as determined by experiments. Regarding the image forming unit 3, although FIGS. 7A and 7N show only the combinations of the fixing unit 4, writing unit 5, transporting unit 6 and image forming unit body, the gearing unit 7 may of course be combined. Such additional combinations will not be described specifically since they are easy to analogize.

FIG. 7A shows the most basic combination, i.e., the combination of the base unit 1, paper feeding unit 2 with a paper cassette, and basic image forming unit 3 which are removable from one another. In this configuration, the paper cassette of the paper feeding unit 2 may be built in the base unit 1. Let the combination shown in FIG. 7A be referred to as a combination A-1 hereinafter (see FIG. 4A). When the image forming unit 3 is implemented with the electrophotographic system or similar system in which a latent image is electrostatically formed on an image carrier such as a photoconductive element, then developed by a toner or similar powdery developer, and then transferred to a paper sheet, it is necessary to fix the toner image on the paper sheet. While the fixing device may be incorporated in the image forming 3, it may alternatively be constructed into the fixing unit 4 independent of the image forming unit 3 and removably mounted on the unit 3, as shown in FIG. 7B. Such an independent fixing unit 4 will be advantageous when a paper sheet is transported through a plurality of successive image forming units 3, as will be described. When the independent fixing unit 4 is used, the image forming unit 3 does not have to incorporate it therein and, therefore, can be provided with a modified configuration. The combination of the so modified image forming unit 3a and fixing unit 4 is shown in FIG. 7B and will be called a combination A-2 hereinafter.

When the image carrier of the image forming unit 3 or 3a is implemented with a photoconductive element, the image writing device may be constituted by an optical device using a laser beam, for example. So long as the writing device is of the type using an LED (Light Emitting Diode) array or a liquid crystal shutter, it can be readily built in the image forming unit and, therefore, can use the combination A-1 or A-2. However, when the writing device uses a He-Ne laser or a semiconductor laser, it may advantageously be constructed into a unit and removably mounted on the image forming unit 3, in which case it is not necessary to install the writing device in the unit 3. FIG. 7C shows the combination of the modified image forming unit 3 without the writing device and will hereinafter be referred to as a combination A-1a (see FIG. 4C). Likewise, the modified first image forming unit body 8'a and the writing unit 5 may be combined as shown in FIG. 7D. This type of combination is a modification of the combination A-2, FIG. 7B, and will hereinafter be referred to as a combination A-2a (see FIG. 4F).

All the combinations shown in FIGS. 7A to 7D have a single image forming unit 3 or 3a or a single image forming unit body 8a or 8a' and are applicable to an ordinary monochromatic image recording procedure. On the other hand, when monochromatic images should be printed out in two or more colors, when a multi-color image should be printed out, or when a different type of image forming system is desired, two or more image forming units 3 have to be used. In such a case, a plurality of basic image forming units 3 may be stacked, as shown in FIG. 7E. The combination shown in FIG. 7E is a modification of the combination A-1, FIG. 7A, and will be called a combination A-1' hereinafter. It is to be noted that the stack of two image forming units 3 shown in FIG. 7E is only illustrative, and this is also true with the other examples. All the combinations A-2, A-1a and A-2a shown in FIGS. 7B to 7D may also be modified to use a plurality of modified image forming unit 3a or a plurality of image forming unit bodies 8a or 8'a. FIG. 7F shows a modification of the combination A-2, FIG. 7B, and this will be referred to as a combination A-2'. Likewise, FIGS. 7G and 7H show modifications of the combinations shown in FIGS. 7C and 7D, and these will be referred to as combinations A-1'a and A-2'a, respectively.

When a plurality of first image forming unit bodies 8a or a plurality of modified first image forming unit bodies 8a are used, they may share a single writing unit 5 in the configuration shown in FIG. 7I. This type of combination will be referred to as a combination A-2'b. The configuration shown in FIG. 7G may also be modified to use a single shared writing unit 5b, although not shown in the figure. Such a modified configuration will be called a combination A-1'b.

In the combinations shown in FIGS. 7A to 7I, a paper sheet fed from the paper feeding unit 2 is transported upward for sideways along transport paths which are defined in the individual image forming units 3 or 3a or image forming unit bodies 8a or 8'a. On the the hand, when a plurality of image forming units 3 or 3a or a plurality of image forming unit bodies 8a or 8'a are used, the transporting unit 6a, FIG. 6A, or the transporting and fixing unit 6b, FIG. 6B, may be removably mounted on the base unit 1 and image forming units 3 or 3a or image forming unit bodies 8a, 8'a, 8b, 8'b, 8d or 8'd. FIGS. 7J to 7N each shows the transporting unit 6a or the transporting and fixing unit 6b. FIGS. 7J to 7N show modifications of the combinations A-1', A-2', A-'a , and A-2'a shown in FIGS. 7E to 7I, respectively.

In the configurations shown in FIGS. 7J to 7N, since the transporting unit 6a or the transporting and fixing unit 6b is independent of the other units, the image forming unit 3 or 3a or the image forming unit body 8a, 8'a, 8b, 8'b, 8d or 8'd can be modified to omit the paper transporting section thereof. In FIG. 7J, the second image forming unit body 8b without the transporting section is shown and constitutes a modification of the basic image forming unit 3 of FIG. 7E. Likewise, FIGS. 7K and 7L show respectively the modified second image forming body unit 8b ' which is a modification of the modified image forming unit 3a of FIG. 7F and the fourth image forming unit body 8d which is a modification of the first image forming unit body 8a of FIG. 7G. Further, FIGS. 7M and 7N show respectively the modified first image forming unit body 8a' and the modified fourth image forming unit body 8'd which are modifications of the modified first image forming units 8'a of FIGS. 7H and 7I, respectively.

FIGS 8A to 8F show various kinds of frames 9 which are selectively usable to assemble the independent units of the image recording apparatus as described with reference to FIGS. 7A to 7N. As shown, each frame 9 has opposite side frames each comprising a horizontal bar or bars 9a and a vertical bar or bars 9b, and a tie bar connecting the side frames. The tie bar 9c is omissible, if desired.

Specifically, in FIG. 8A, the frame 9 has a rectangular configuration having two horizontal bars 9a and two vertical bar 9b. The base unit 1 and paper feeding unit 2 are affixed to the two horizontal bars 9a and two vertical bars 9b while the modified image forming unit body 8'a, for example, is affixed to the upper horizontal frame 9a. The writing unit 5 may also be affixed to the frame 9, if necessary. In FIG. 8B, the frame 9 has a horizontal bar 9a and an elongate vertical bar 9b which join each other in the form of a letter L. In such an L-shaped frame 9, the vertical bar 9b is suitable for mounting the transporting unit 6b, and the vertical frame 9b may used to mount the modified image forming unit body 8'b, for example. The base unit 1 is affixed to the vertical bars 9b and horizontal bars 9a while the horizontal bars 9a are put on the floor.

Figure 8D:
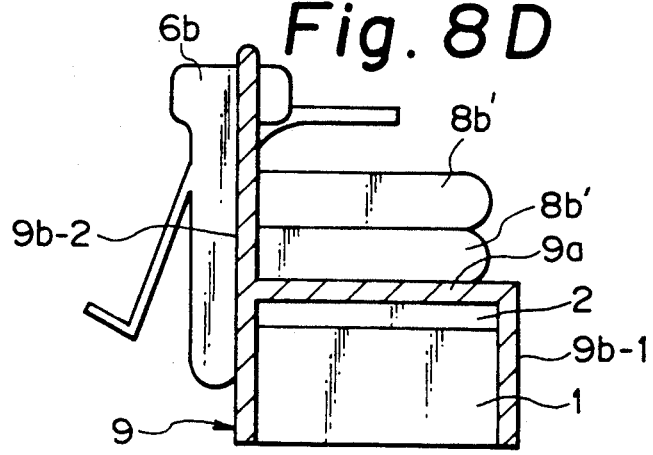
Figure 8E:
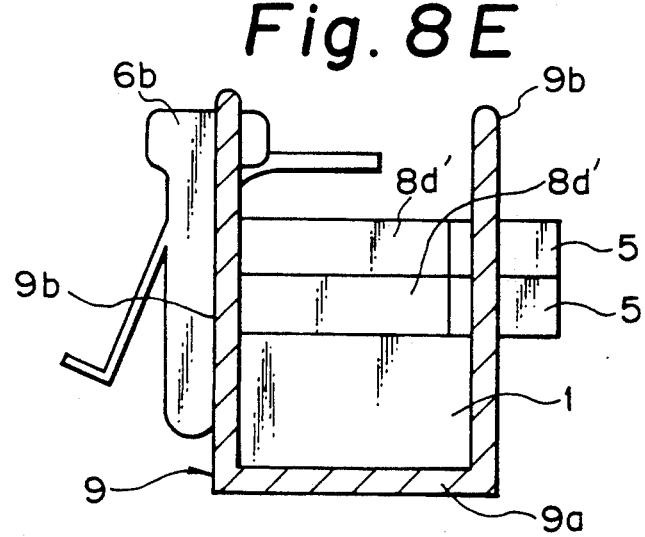
Figure 8F:
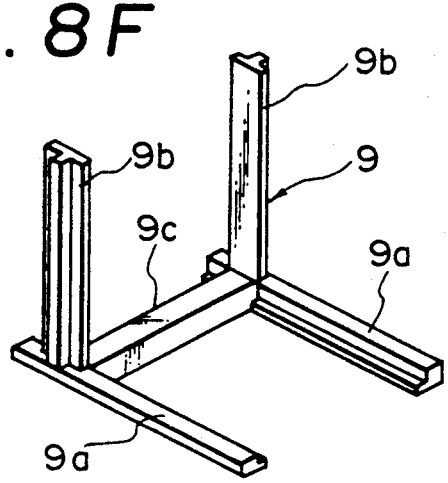

The horizontal bars 9a shown in FIG. 8B may be extended to the rear of the vertical bars 9b, as shown in FIG. 8C. Such a modified configuration will hold the frame 9 in a more stable position. Further, the frame 9 of FIG. 8C may be provided with a structure shown in FIG. 7F specifically. In FIG. 7F, the horizontal frames 9a may have projections to maintain the base unit 1 in a position slightly spaced apart from the floor. FIG. 8D shows a chair-like structure which is a modification of the structure of FIG. 8B and has a single short vertical bar 9b-1 and a single long vertical bar 9b-2 in order to position the horizontal bar 9a above the base unit 1 or the paper feeding unit 2. Further, as shown in FIG. 8E, two long vertical bars 9b may be used to form a generally U-shaped frame 9. Various implementations are available for mounting the individual units to the frame 9, e.g., the combination of sliding channels and stops, and screws. Alternatively, each vertical frame and each unit may be respectively provided with projections and recesses which mate with the projections.

Figure 9A:
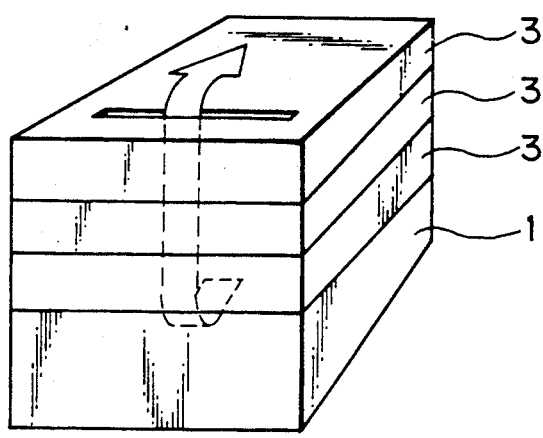
FIGS. 9A to 9D are perspective views each showing a specific condition wherein various units constituting an image recording apparatus of the present invention are connected.
Figure 9B:
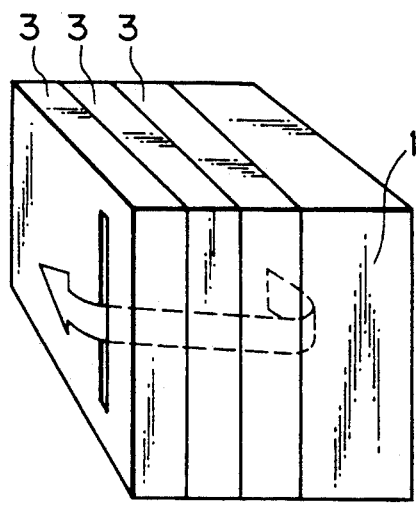
Figure 9C:
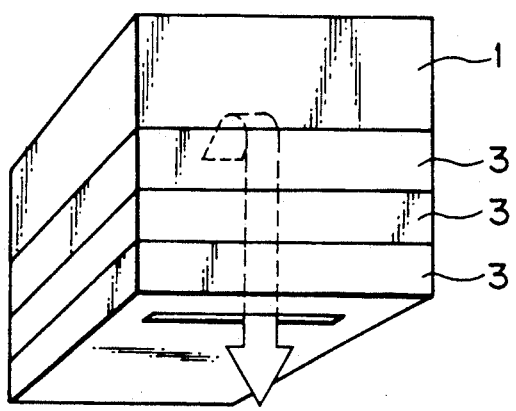
Figure 9D:
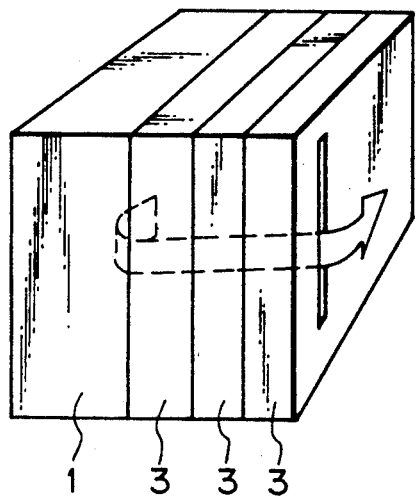

In the various configurations shown and described, the image forming units 3 are stacked on the base unit 1. The direction in which the units 3 are stacked is selectable, as shown in FIGS. 9A to 9D. Specifically, FIG. 9A shows a configuration for transporting a paper sheet upward from the base unit 1 and in principle identical with the foregoing configurations. In FIG. 9B, the configuration shown in FIG. 9A is brought down 90 degrees to transport a paper sheet from the right to the left in the figure. In FIG. 9C, the configuration of FIG. 9A is turned upside down to transport a paper sheet downward. In FIG. 9D, the configuration shown in FIG. 9B is reversed in the right-and-left direction for transporting a paper sheet from the left to the right. While the paper transporting direction and, therefore, the configuration of the image forming units 3 may be limited to, for example, those shown in FIG. 9A by the image forming system used, any one of the configurations shown in FIGS. 9A to 9D is usable when the paper transporting direction is not limited such as in a thermal printing system. Any desired transporting direction is selectable in matching relation to the space available for the installation of the apparatus.

Specific constructions of the base unit 1, paper feeding unit 2 and image forming unit 3 will be described hereinafter.

Figure 10:
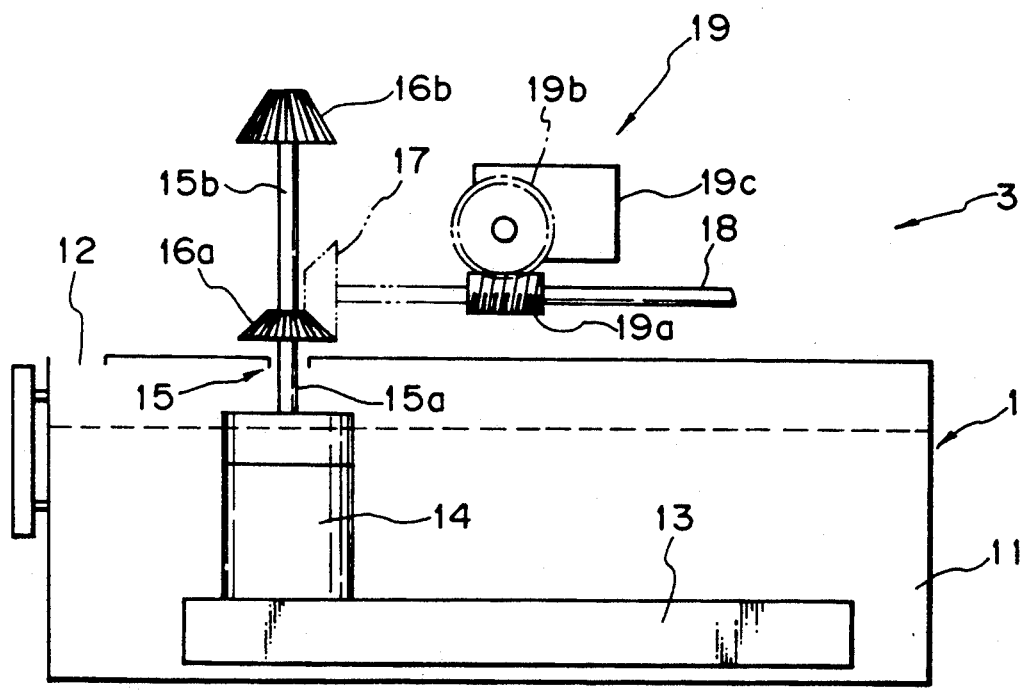
FIG. 10 is a view showing a base unit.

As shown in FIG. 10, the base unit 1 has a casing 11 which is provided with a paper inlet 12. The casing 11 accommodates a circuit board 13, a motor 14, and a mechanical driveline 15 therein. Provided on the circuit board 13 are a CPU or similar electric control, an interface, an image processing system including a signal memory, and a system for driving the system built in the image forming unit 3. The output torque of the motor 14 is transmitted to the image forming unit 3 by the driveline 15. The driveline 15 has, for example, a transmission shaft 15a connected to the motor 14, and a first bevel gear 16a. The bevel gear 16a meshes with, for example, a bevel gear 17 disposed in the image forming unit 3 which is placed on the base unit 1. A second bevel gear 16b is mounted on a transmission shaft 15b which is connected to the transmission shaft 15a. The bevel gear 16b meshes with a bevel gear, not shown, which is also disposed in the image forming unit 3. In the image forming unit 3, the bevel gear 17 is mounted on a transmission shaft 18. The rotation of the transmission shaft 18 is imparted to rollers and other rotatable members by the combination of a worm 19a and a worm wheel 19b or similar mechanism and an accelerating and decelerating mechanism 19. This mechanism 19 includes a clutch, solenoid or similar transmission ON-OFF device 19c. The image forming unit 3 or 3a or any of the image forming unit bodies 8a to 8f and 8'a to 8'f, like the base unit 1, has a transmission shaft 15b connectable to the transmission shaft 15a for imparting the drive to the overlying image forming unit, and a bevel gear 16b mounted on the shaft 15b.

Of course, the construction shown in FIG. 10 is only illustrative and may be replaced with any other suitable construction so long as it can transmit a torque from one unit to another.

Figure 11:
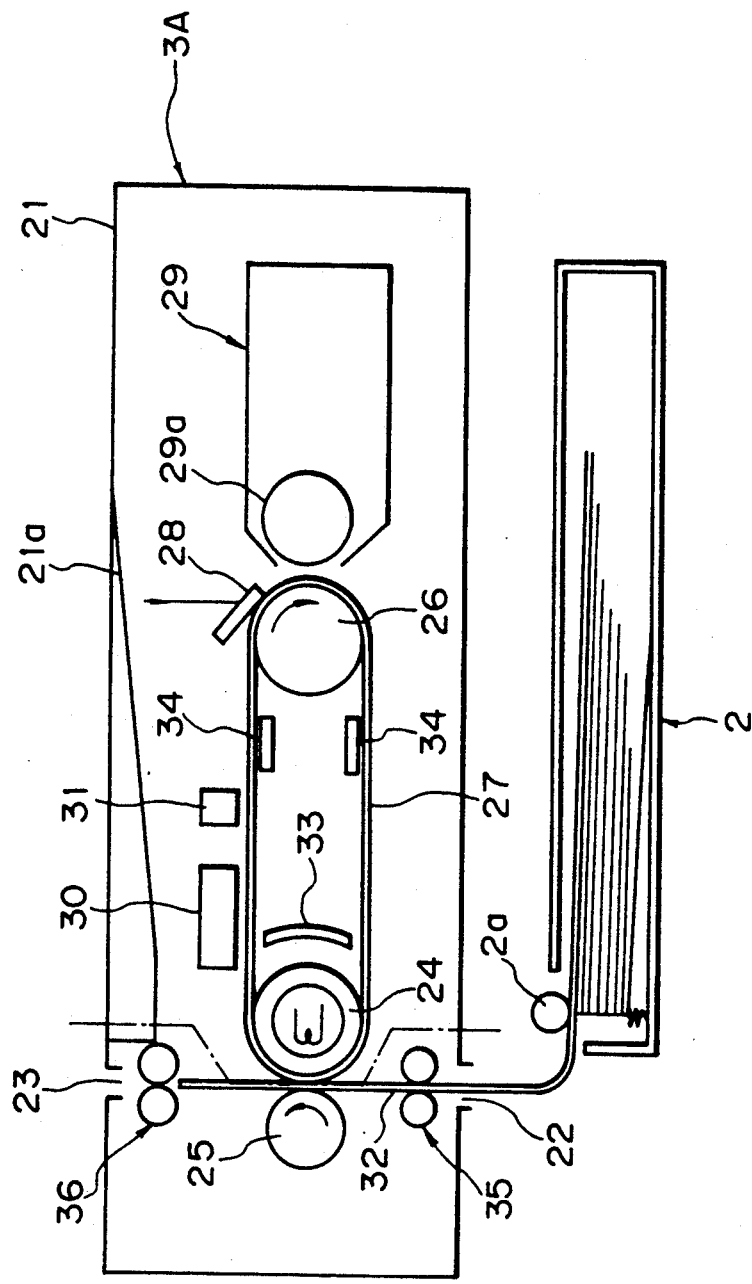
FIGS. 11 to 13 are views each showing a specific construction of an image forming unit.

FIG. 11 shows a first specific construction, generally 3A, of the image forming unit 3 which uses the electrophotographic procedure. As shown, the unit 3A has a single casing 21 which is provided with a paper inlet 22 and a paper outlet 23. In the case of the thermomagnetic writing system, a heat roller 24 and a a pressure roller 25 pressing against the heat roller 24 are located on a substantially linear transport path which extends from the inlet 22 to the outlet 23. The roller 24 and 25 define a printing station. A belt 27 is passed over the heat roller 24 and a tension roller 26 for forming a latent image thereon. The belt 27 may be implemented as a magnetic belt made of, for example, a magnetic material containing $CoO_2$. While the belt 27 is driven in a direction indicated by an arrow in the figure, a writing head 28, a developing device 29, a cleaner 30 and an eraser 31 arranged along the belt 27 perform image forming operations. Specifically, the writing head 28 records a latent image on the belt 27 in response to a write signal fed from the base unit 1. A developing roller 29a included in the developing device 29 develops the latent image to produce a visible image. The visible image is transferred to and fixed on a paper sheet being transported between the roller 24 and 25. The cleaner 30 removes a developer remaining on the belt 27 after the image transfer, and then the eraser 31 erases the latent image. A heat insulating member 33 is located beside the heat roller 24 to prevent the belt 27 and other parts from being heated excessively by the heat roller 24. Further, heat radiating member 34 are arranged for cooling the belt 27. A recess 21a is formed on the top of the casing 21 to play the role of a tray for receiving paper sheets driven out of the unit 3A.

In FIG. 11, the axes of rollers 24, 25 and 26 are arranged in substantially the same plane, so that the image forming unit 3A has a flat configuration. Then, the container of the developing device 29 may advantageously be provided with a thin configuration extending along the plane that contains the rollers 24 to 26. Transport roller pairs 35 and 36 may be provided on the transport path in the casing 21, as needed.

The base unit 1 and first image forming unit 3A constitute the image forming apparatus shown in FIG. 7A. When a black image and a monochromatic color image are to be selectively formed, a plurality of first image forming units 3A will be arranged side by side, as shown in FIG. 7E. In this case, one of the units 3A will be loaded with a black developer while the others each will be loaded with a developer of particular color.

In FIG. 11, in the event of image forming, a paper sheet 32 is fed out by a feed roller 2a from a paper cassette included in the paper feeding unit 2 which is incorporated in the base unit 1, the image forming unit overlying the base unit 1. The paper sheet 32 enters the image forming unit 3A through the inlet 22. The heat roller 24 transfers a toner image to and fixes it on the paper sheet 32. The paper sheet 32 carrying the toner image thereon is driven out of the unit 3A via the outlet 23. When a single image forming unit 3A is used, the paper sheet with the toner image is immediately received in the recess or tray 21a. When two or more image forming units 3A are stacked together, the paper sheet is transported to the uppermost unit 3A and driven out therefrom. When a plurality of image forming units 3A are stacked as mentioned, it is necessary that the image forming units 3A and other than a desired particular unit 3A be not operated. For this purpose, one or both of the pressure roller 25 and heat roller 24 should preferably be moved away from each other in each of the other image forming units 3A.

Figure 12:
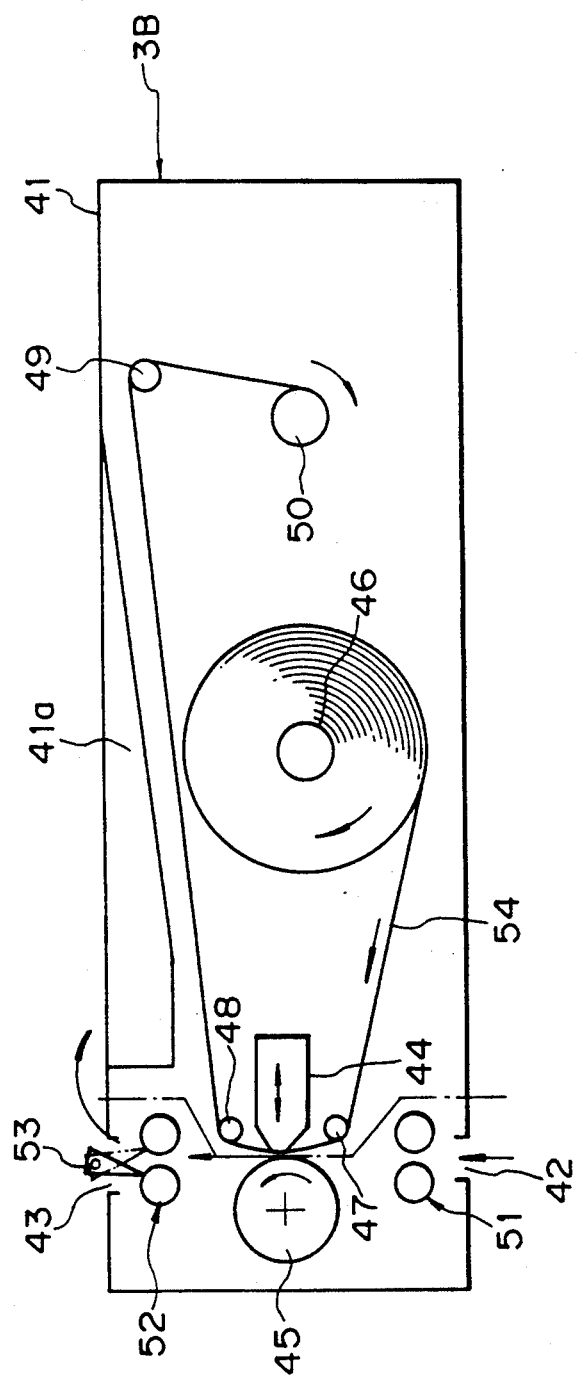

FIG. 12 shows a second specific construction, generally 3B, of the image forming unit 3 which is implemented with the thermal printing system. As shown, the image forming unit 3B has a casing 41 which provided with a paper inlet 42 and a paper outlet 43. A thermal head 44 capable of printing one line of data at a time and a back-up roller 45 facing the head 44 are arranged on a substantially linear transport path which extends from the inlet 42 to the outlet 43. The head 44 and roller 45 define a printing station. An ink ribbon 54 intervenes between a paper sheet being transported and the thermal head 44 and is movable in a predetermined direction. The ink ribbon 54 is payed out from a supply roller 46, guided through the printing station by a first and a second roller 47 and 48, and guided to a take-up roller 50 by a third roller 49. The axes of the thermal head 44 and rollers 45, 46 and 50 are positioned in substantially the same plane, so that the casing 41 may have a flat configuration. Transport rollers 51 and 52 are arranged on the transport path in the casing 41, as needed.

A selector in the form of a pawl 53 may be used to selectively steer a paper sheet coming out from the outlet 43 toward a tray 41a provided on the top of the casing 41 or toward the left side as viewed in the figure. The axis of rotation of the selector 53 may be shiftable to direct a paper sheet toward the paper inlet of the overlaying image forming unit. The selector 43 may be incorporated in the casing 21, FIG. 11, in exactly the same configuration. The thermal head 44 is movable between a position where it presses against the back-up roller 45 for printing out data, and a position where it is spaced apart from the roller 45, as indicated by an arrow in the figure. To form a color image, a plurality of image forming units 3B each having an ink ribbon 54 of particular color may be used.

Figure 13:
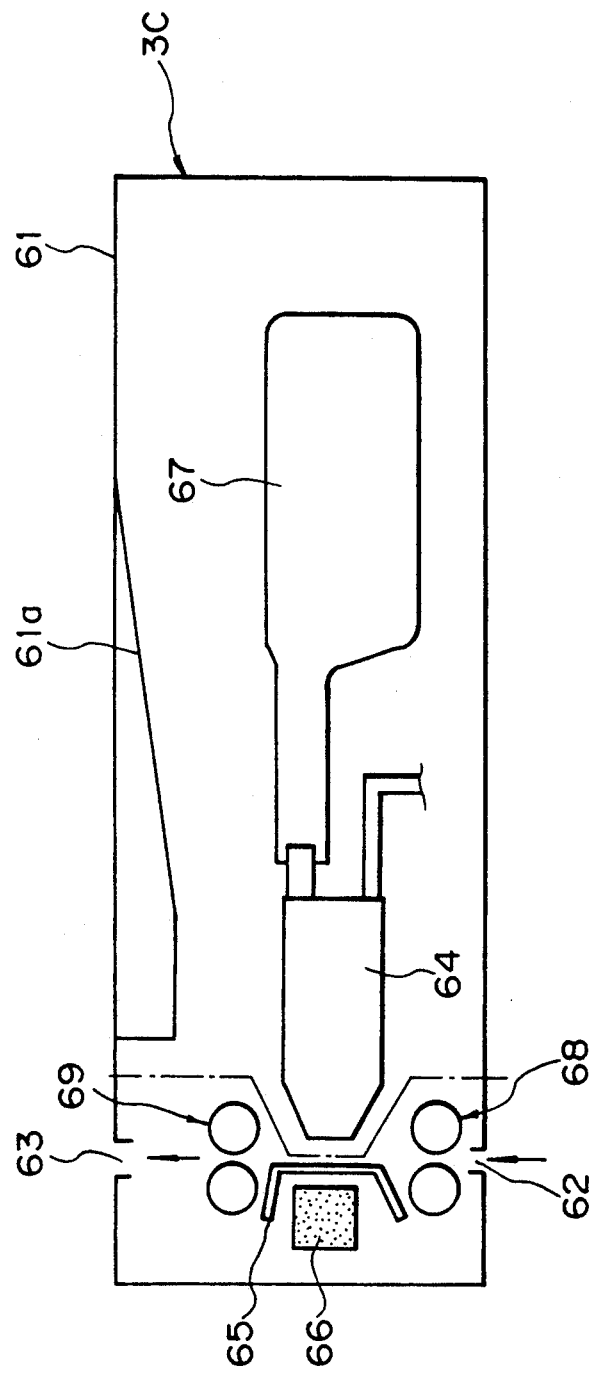

FIG. 13 shows a third specific construction, generally 3C, of the image forming unit 3 which is implemented with the ink jet printing system. As shown, the image forming unit 3C has a casing which is formed with a paper inlet 62 and a paper outlet 63. A recording head 64 defines a printing station on a substantially linear transport path extending from the inlet 62 to the outlet 63. A platen 65 and an ink absorbing member 66 are located to face the head 64. An ink reservoir 67 is removably mounted on the head 64. The head 64 ejects a jet of ink in response to an image signal fed from the base unit 1, thereby printing out data on a paper sheet. The head 64, platen 65, ink absorbing member 66 and ink reservoir 67 are aligned with one another to provide the casing 61 with a flat configuration. Transport roller pairs 68 and 69 are arranged in the casing 61, as needed. A recess or tray 61a is formed on the top of the casing 61 for receiving paper sheets sequentially coming out from the outlet 63. The outlet 63 may be provided with a selector or pawl, as in the construction shown in FIG. 12. A plurality of image forming units 3C whose reservoirs 67 each is filled with ink of particular color may be stacked together, in which case one of them that actually forms an image will be selected by a command from the base unit 1. Ink get printing systems include an on-demand type system such as a bubble jet type system or a slit jet type system, and a demand-type system such as a vibration system or a charge control system. Any one of such different types of systems can be constructed only if various components thereof are accommodated in a flat casing with reference to FIG. 13. Among them, the on-demand type system will promote the minizaturization of the image forming unit.

Regarding the thermal printing system and wire dot printing systems which are other image forming systems, their components will also be accommodated in a casing similar to any one of the casings shown and described to constitute a single image forming unit.

In any of the image forming units 3A to 3C, there may be additionally incorporated a cooling fan, sensors and circuits for promoting desirable image forming operations, solenoids, and miniature motors, as needed.

Figure 14:
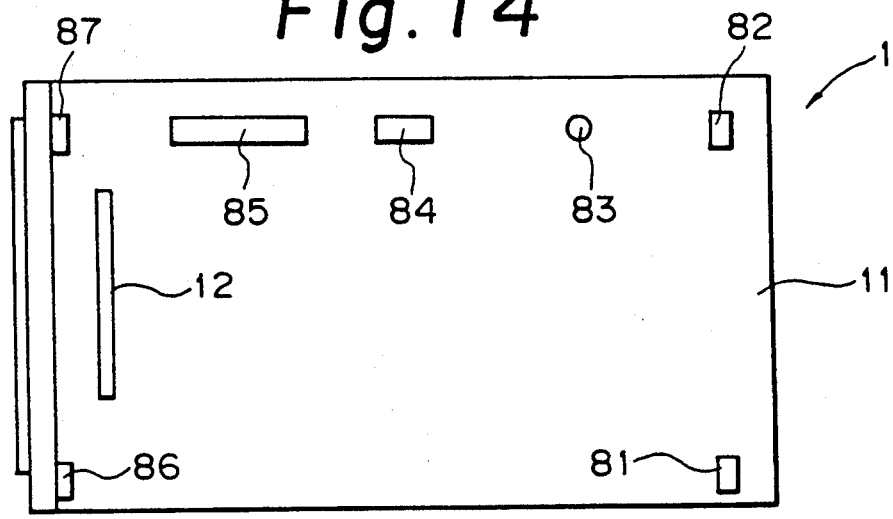
FIG. 14 is a top plan view of the base unit or the image forming unit.
Figure 15:
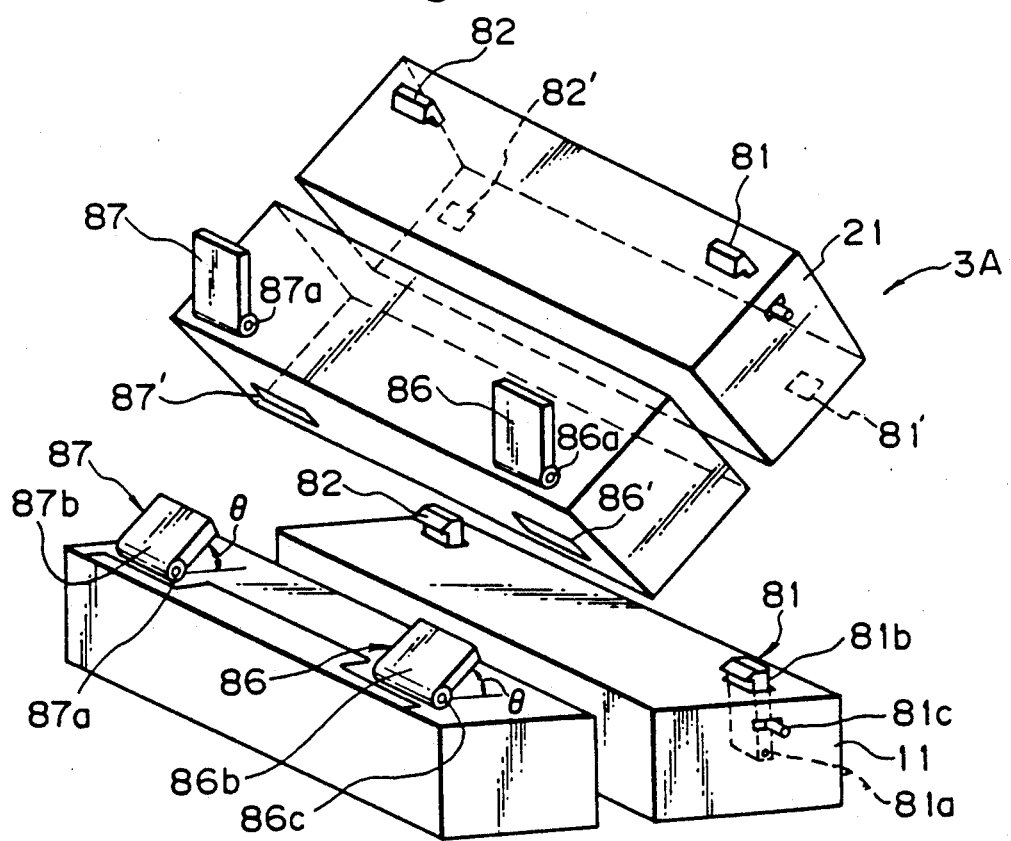
FIG. 15 is an exploded perspective view showing the connection of the base unit and the image forming unit.

An image recording apparatus is constructed by mounting the image forming unit 3 on the base unit 1 in the configuration shown in FIG. 7A, as stated earlier. if necessary, another image forming unit 3 is mounted on the image forming unit 3 that just overlies the base unit 1, as shown in FIG. 7E. of course, positioning, affixing, and mechanical and electrical interconnecting implementations have to be provided between the base unit 1 and the overlying image forming unit 3 and between the image forming units 3. FIGS. 14 and 15 show specific arrangements for allowing any of the units to be readily connected to the underlying unit when simply placed on the latter. Specifically, as shown in FIGS. 14 and 15, the casing 11, 21 41 and 61 of the various units 3A to 3C, for example, each is provided with a first and a second joint 81 and 82 for connecting the unit to the overlying unit, an opening 83 for connecting mechanical driveline, an electrical high voltage connector 84, an electrical signal connector 85, and a third and a fourth joint 86 and 87. These joints, opening and connectors are individually provided with indentical shapes and located at the same positions in all of the units. FIG. 14 shows the upper end of the casing 11 of the base unit 1 while FIG. 15 shows the casing 21 of the first image forming unit 3A, FIG. 11, to be connected to the casing 11.

The casings 21, 41 and 61 each has at the underside thereof openings 81', 82', 86' and 87', an opening 83', an electrical high voltage connector 84', and an electrical signal connector 85', not shown, which face respectively the joints 81, 82, 86 and 87, opening 83, high voltage connector 4, and electrical signal connector 85, FIG. 14. A specific configuration of the third and fourth joints 86 and 87 is shown in FIG. 15. As shown, the casing 11 of the base unit 1 and the casing 21 of the first image forming unit 3A, for example, each has on the top thereof flat support members 86b and 87b which serve as the joints 86 and 87, respectively. The support members 86b and 87b are respectively rotatably mounted on shafts 86a and 87a, and each is constantly biased by a spring or similar biasing means to an open position by an angular distance of $\theta$ degrees. The casing 21 of the image forming unit 3A has the opening 86' and 87' for receiving the support members 86b and 87b.

To mount the image forming unit 3A on the base unit 1, the support members 86b and 87b are respectively mated with the opening 86' and 87' in an inclined position, and then the unit 3A is angularly moved onto the unit 1. The joints 81 and 82 provided on the base unit 1 are respectively implemented as hooks 81b and 82b which are rotatably mounted on pins 81a and 82a, respectively. The hooks 81b and 82b mate respectively with the openings 81' and 82' of the casing 21 of the image forming unit 3A. Specifically, the hooks 81b and 82b each is held in a mating position by a spring, for example. Hence, when the casing 21 of the image forming unit 3A is mounted on the casing 11 of the base unit 1, the hooks 81b and 82 automatically mate with the openings 86' and 82', respectively. To release the hooks 81b and 82b from the associated openings 81' and 82'a pin 81c and a pin 82c, not shown, or similar means are manipulated to move the hooks 81b and 82b out of engagement with the openings 81' and 82'. It should be noted that the joints shown and described are only illustrative and may be replaced with any other suitable structure so long as it is capable of locking the image forming units 3 or the image forming unit 3 and the base unit 1. The joints 86 and 87 may be provided not only on the casing 11 of the base unit 1 but also on the casings 21, 41 and 61 of the image forming units 3A to 3C.

Figure 16:
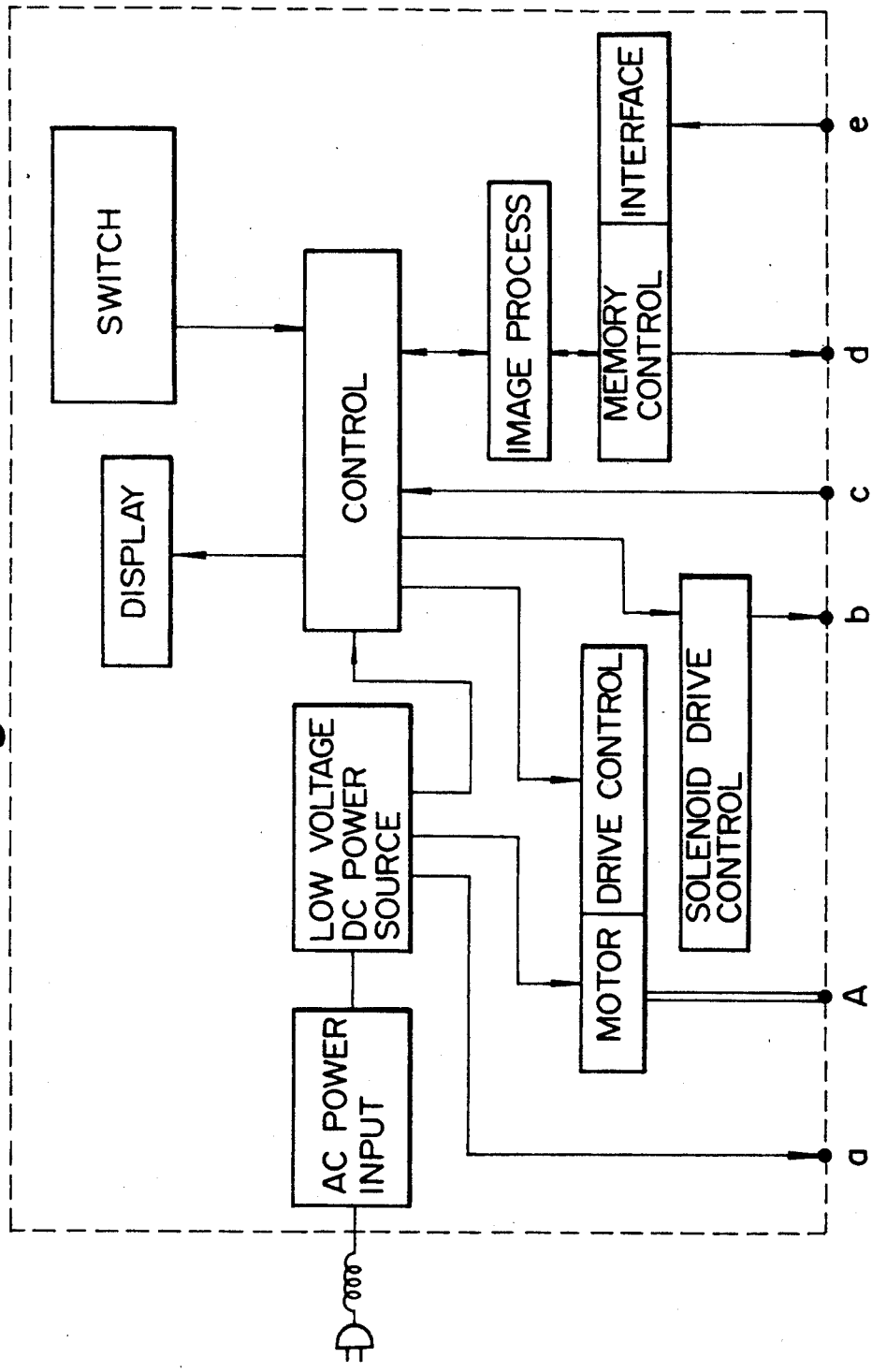
FIG. 16 is a block diagram schematically showing control circuitry incorporated in the base unit.

Referring to FIG. 16, control circuitry arranged on the circuit board 13 inside the base unit 1 is shown. As shown, an AC power source input circuit feeds an AC input from a power source cord to the inside of the base unit 1. A low voltage DC power source feeds DC to various electrical circuit boards and motors. A control unit controls the operations of the entire apparatus as well as the image signal to be fed to the image forming unit 3. A display informs the operator of the operating conditions of the base unit 1 and image forming unit 3. A switch is automatically or manually operated in matching relation to the image forming unit 3 and reads the image forming unit 3. An image processing circuit and a memory control circuit delivers an image signal to a thermal head or an ink jet driver incorporated in the image forming unit 3. A motor, a motor drive control circuit and a solenoid drive control circuit control the operations of the image forming unit 3. The control circuitry has connectors a to e for inputting and outputting electric signals. Specifically, a DC voltage is outputted via the connector a to electric circuits accommodated in the image forming unit 3. Signals for operating solenoids also accommodated in the unit 3 are fed out via the connector b. Output signals of sensors incorporated in the unit 3 are inputted via the connector c. The image signal is fed out via the connector d. The connector e is connectable to a word processor or similar equipment. The connectors a to d and the connector e are implemented with Centronics and RS-232C, respectively. Labeled A is a rotary shaft for transmitting the rotation of the motor to the image forming unit 3. In principle, a drive source and a controller are not built in the image forming units 3. however, each image forming unit 3 may be provided with a cooling fan, sensors and circuits for promoting desirable image forming operations, solenoids, miniature motor, etc.

Assume that a plurality of image forming units sharing the same image forming principle are stacked on the base unit 3 in the configuration shown in FIG. 7E for forming a color image. The number of such units 3 depends on the number of colors that form a color image. As the base unit 1 feed a paper sheet, the first image forming unit 3 forms an image of one color on the paper sheet, and then the second image forming unit 3 forms an image of another color over the previously formed image. To form a full-color image, three or more image forming units 3 have to be stacked together on the base unit 1. In this case, the paper discharging direction is determined by the selector or pawl of the uppermost image forming unit 3 while the selectors of the intervening image forming units 3 are so positioned as to transport a paper sheet vertically. A paper sheet may be inserted by hand from the outside of the base unit 1, if desired.

Figure 17:
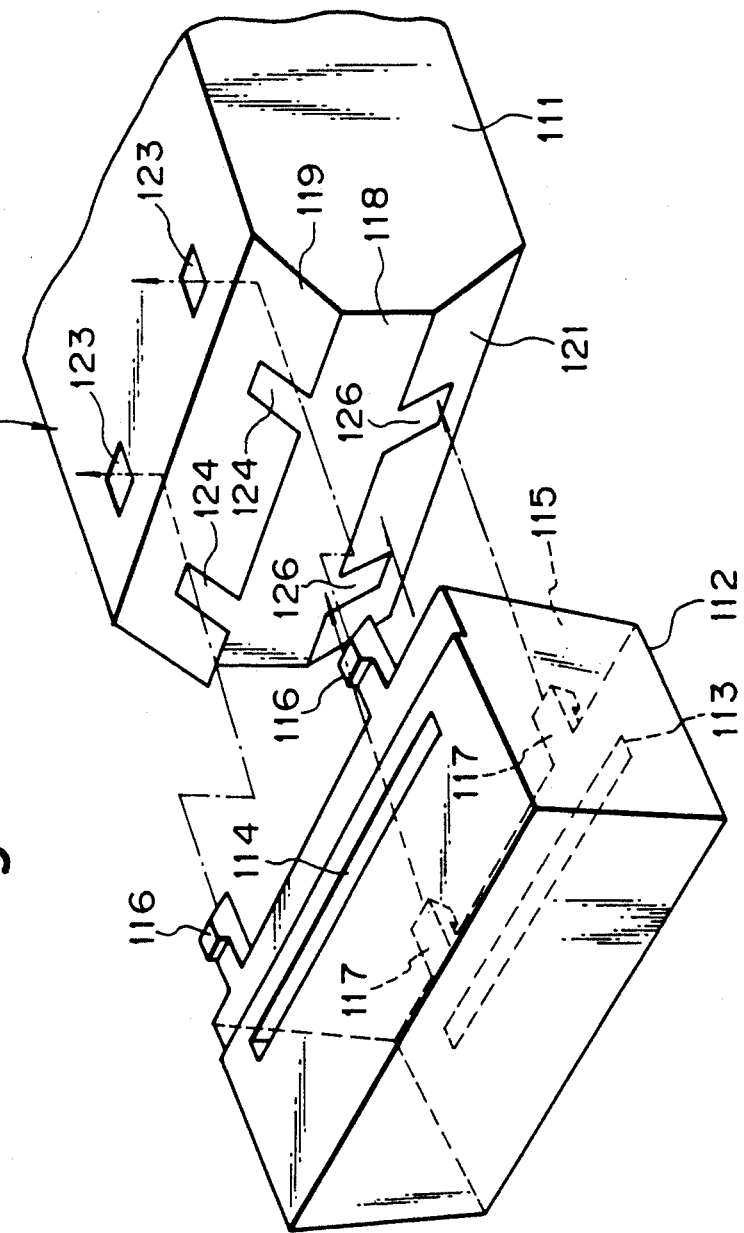
FIG. 17 is an exploded perspective view of an image forming unit body of the image forming unit and a transporting unit.
Figure 19:
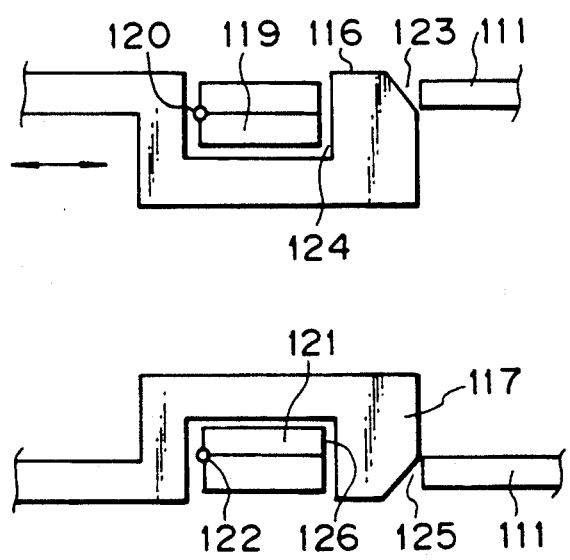
FIG. 19 is a fragmentary section showing the connection of a casing included in the image forming unit and the casing of the transporting unit.

When a plurality of image transporting units 3 are stacked on the base unit 1 to form a color image, a paper sheet is sequentially transported by the transport rollers accommodated in the individual units 3, e.g., the roller pairs 35 and 36 of the image forming unit 3A, the roller pairs 51 and 52 of the image forming unit 3B and the roller pairs 68 and 69 of the image forming unit 3C. Then, it is likely that the paper sheet slackens or bends during the transport to cause the images of different colors to deviate from one another. it is preferable, therefore, to transport a paper sheet by transporting means which is shared by the plurality of image forming units 3. For this purpose, the image forming units 3A, 3B and 3C are divided into two parts at the positions indicated by dash-and-dot lines in FIGS. 11, 12 and 13, respectively. Specifically, the unit 3A is divided into an image forming unit body 3A' including the image forming means and a transporting section 3A" including the transporting means, i.e. roller pairs 35 and 36 and pressure roller 25. The unit 3B is divided into an image forming unit body 3B' including the imaging forming means and a transporting section 3B" including the transporting means, i.e. roller pairs 51 and 52 and backup roller 45. The unit 3C is divided into an image forming unit body 3C' and a transporting section 3" including the transporting means, i.e. roller pairs 68 and 69, platen 65 and ink reservoir 66. For example, as shown in FIGS. 17 and 19, the casing 21 of the image forming unit 3A, the casing 41 of the image forming unit 3B or the casing 61 of the image forming unit 3C is divided into a body casing part 111 and a transport casing parts 112. The casing parts 111 and 112 are respectively used as the casing of the unit 3A', 3B' or 3C' and the casing of the transporting section 3A", 3B" or 3C".

The transport casing 112 has a paper inlet 113, a paper outlet 114, and an open end 115 that faces the body casing 111. The transport roller pairs and other necessary parts and elements are accommodated in the transport casing 112, although not shown in the figures. The paper inlet 113 corresponds to the paper inlet 22 in the case of the image forming unit 3A or to the paper inlet 42 in the case of the image forming unit 3B. The paper outlet 114 corresponds to the paper outlet 23 in the case of the unit 3A or to the paper outlet 43 in the case of the unit 3B. A pair of hooks 116 extend out from the upper end of the transport casing 112 on the side where the open end 115 is located. A pair of hooks 117 also extend out from the lower end of the casing 112.

Figure 18:
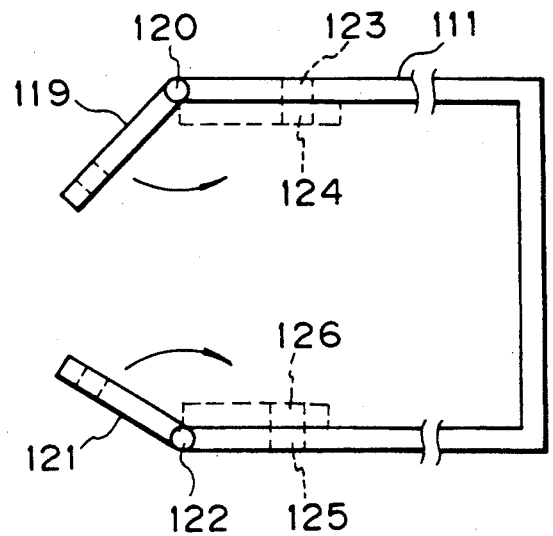
FIG. 18 is a fragmentary section of a casing included in the image forming unit body of the image forming unit.

As shown in FIG. 17, the body casing 111 has an open end 118 that faces the open end 115 of the transport casing 112. An upper cover 119 covers a part of the upper portion of the open end 118. As shown in FIG. 18, the upper cover 119 is rotatably connected to the upper wall of the casing 111 by a pin 120 to be movable between a first and a second position which are respectively indicated by a solid line and a dashed line. In the first position, the cover 119 extends obliquely downward at a predetermined angle to cover the open end 118 as mentioned above while, in the second position, it is fully folded into the body casing 111. The cover 119 is held in the first position by a spring or similar means when it is free from externally derived forces. A lower cover 121 covers a part of the lower portion of the open end 118. The lower cover 121, like the upper cover 119, is connected to the lower wall of the body casing 111 by a pin 122 to be movable between a first and a second position which are respectively indicated by a solid lie and a dashed line. In the first position, the cover 121 extends obliquely upward at a predetermined angle to cover the open end 118 as mentioned above while, in the second position, it is fully folded into the body casing 111. The cover 121 is held in the first position by a spring or similar means when it is free from externally derived forces.

As the transport casing 112 is inserted into the body casing 111, the upper hooks 116 and the lower hooks 117 urge respectively the upper cover 119 and the lower cover 121 until the cover 119 and 121 each reaches the fully folded position. When the transport casing 112 reaches a predetermined position, the hooks 116 each mates with respective one of holes 123 formed through the upper wall of the body casing 111 via notches 124 which are formed in the upper cover 119. Likewise, the lower hooks 117 each mates with respective one of holes 125 formed through the lower wall of the body casing 111 via notches 126 which are formed in the lower cover 121. When the ends of the hooks 116 and 117 protruding from the upper and lower walls of the body casing 111 are pressed by hand, the transport casing 112 will be readily released from the body casing 111. The casing 111 and 112 which are separable from each other as stated above will facilitate, for example, the removal of a paper sheet jamming the transport path.

Figure 20:
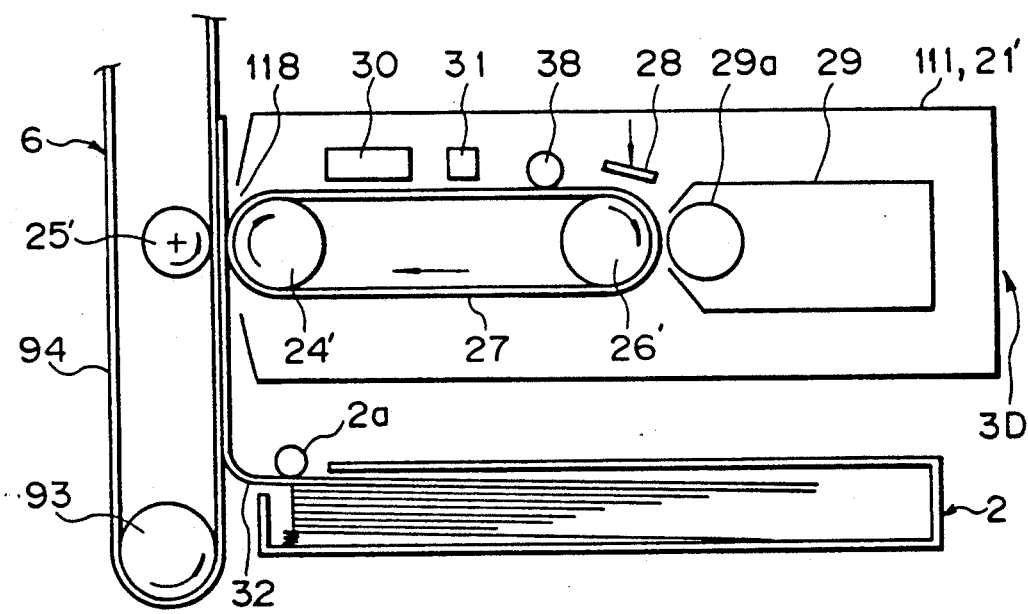
FIG. 20 is a view showing the image forming unit and the transporting unit connected to each other.

Assume that a plurality of image forming units 3 are stacked on the base unit 1, as shown in FIG. 7E. As a person separates the transport casing 112 of each of the units 3 from the associated body casing 111 by releasing the hooks 116 and 117, the open end 118 of the body casing 111 is exposed to the outside. In this condition, as shown in FIG. 20, the transporting unit 6 is so positioned as to close the open end 118 of the body casing 111 or 21 (see FIG. 7J). Specifically, after the base unit 1 and various image forming unit bodies such as 8b, 8'b, 8d, 8'd, 8e and 8'e are stacked together, the transporting unit 6 is affixed to the stack in such a manner as to bridge the base unit 1 to the image forming unit bodies and the image forming unit bodies to each other. For example, the transporting unit 6 is mounted on the image forming unit body 3A' of the image forming unit 3A. FIG. 20 shows a fourth image forming unit 3D which is a modification of the unit 3A shown in FIG. 11 and implemented with electrophotography. In FIG. 20, a casing 21' has only the body casing 111, FIG. 17, and lacks the transport casing 112. That is, the transport casing 112 is replaced with the transporting unit 6 which, together with a paper feeding unit forms an image receiving unit for a paper sheet as an image receiving element.

In the image forming unit 3D shown in FIG. 20, the belt 27 for forming a latent image thereon is passed over a roller 24' and a tension roller 26' and constituted by a photoconductive belt. While the belt 27 is driven in a direction indicated by an arrow in the figure, a primary charge roller 38, writing optics 28' and the the developing device 29, cleaner and eraser 31 arranged along the belt 27 perform image forming operations. Specifically, the primary charge roller 38 uniformly charges the belt 27 to predetermined polarity. The optics 28 such as an LED array is driven by a write signal fed from the base unit 1 to record a latent image on the charged belt 27. The developing roller 29a of the developing device 29 develops the latent image to produce a toner image. The toner image is transferred to a paper sheet 32 being moved between the roller 24' and a transfer roller 25'. The paper sheet 32 is fed out from the paper cassette by the feeder roller 2a and transported by a belt 94 included in the transporting unit 6. After the image transfer, the cleaner 30 removes the remaining toner from the belt 27 while the eraser 31 dissipates the charge remaining on the belt 27. The belt 27 may alternatively be implemented as a dielectric belt or a ferroelectric material which allows a stylus or a thermal head to record an image thereon. An exclusive power source may or may not be connected to the transfer roller 25' to generate an electric field necessary for the transfer of toner particles.

In the specific construction shown in FIG. 20, the axes of the rollers 24', 26' and 29a lie in substantially the same plane, so that the unit 3D has a flat configuration. Then, it is preferable that the container of the developing device 29 also has a thin configuration extending along the plane containing the rollers.

Assume that the user desires to selectively form a black image and a monochromatic color image or to form a multi-color image. Then, one image forming unit will be loaded with a black developer while the others each will be loaded with a developer of particular color, or the image forming units each will be filled with a developer of particular color matching a separated color. Regarding a multi-color image, use may be made of yellow, magenta and cyan developers and, if necessary, a black developer.

Figure 21:
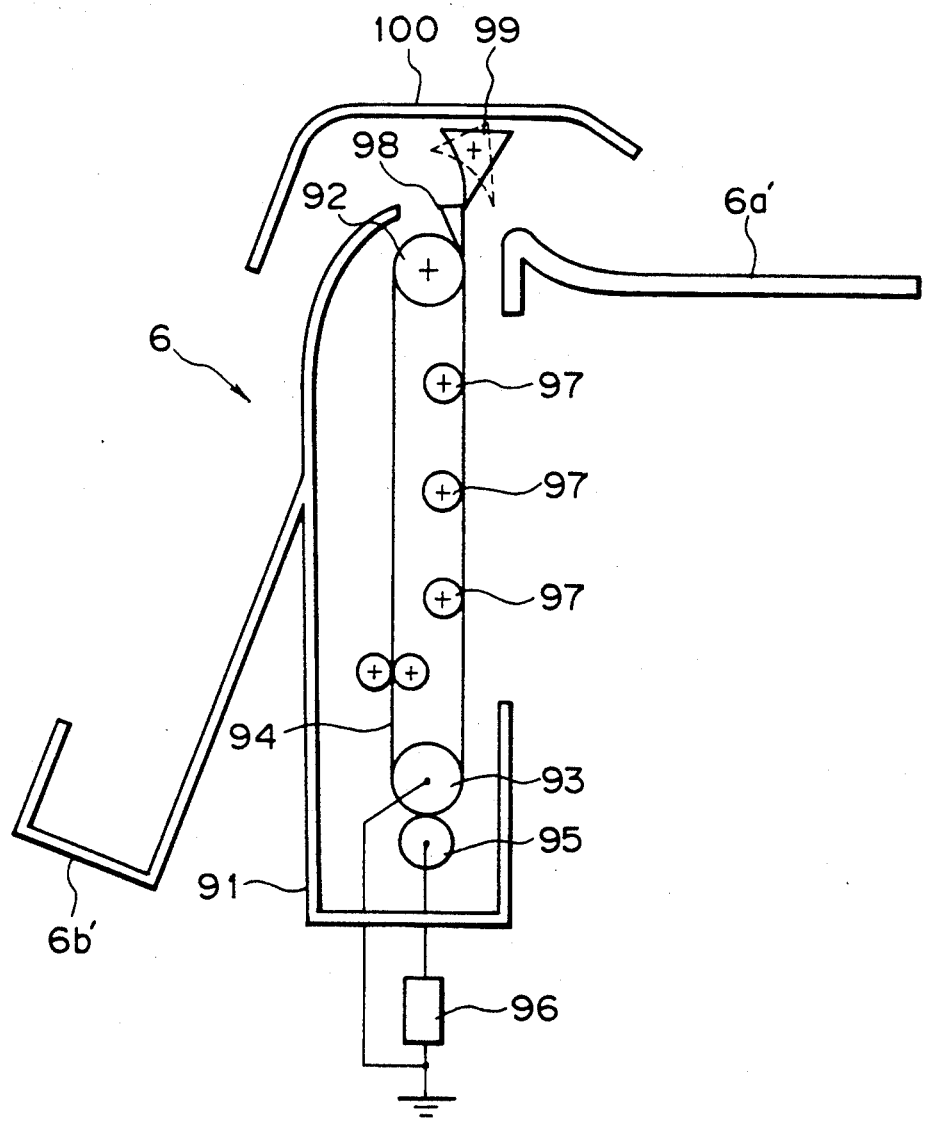
FIG. 21 is a section of the transporting unit.

As shown in FIG. 21, the transporting unit 6 has a casing 91 and a drive roller 92 and a driven roller 93 which are accommodated in the casing 91. The transport belt 94 is passed over the rollers 92 and 93. A motor, not shown, may be disposed in the casing 91 for driving the drive roller 92. A potential forming roller 95 is rotatably supported in a position where it faces the driven roller 93 with the intermediary of the belt 94. An exclusive power source 96 is connected to the potential forming roller 95. The driven roller 93 is connected to ground. Implemented with a dielectric sheet, the belt 94 is applied with a voltage from the potential forming roller 95 so that positive and negative potentials are formed on the belt 94 in stripes, checkers or similar pattern which promotes efficient electrostatic attraction and transport of a paper sheet. The belt 94 is guided by guide rollers 97 between the drive and driven rollers 92 and 93. The role of the back-up roller 45 of the image forming unit 3B may also be assigned to the guide rollers 97. If desired, the platen 65 and ink absorbing member 66 of the image forming unit 3C may be disposed in the casing 91 of the transporting unit 6 to face the head 44 or the image forming unit 3B or the head 64 of the image forming unit 3C.

In FIGS. 20 and 21, a paper sheet 32 fed from the paper cassette of the paper feeding unit 2 by the feed roller 2a is transported by the belt 94 while being retained on the belt 94 due to the potential pattern formed by the roller 95. Images are sequentially formed on the paper sheet 32 at the recording positions of the successive image forming units 3A, 3B, 3C and 3D. When the guide rollers 97 serve as back-up rollers 45, the paper sheet 32 will be pressed against each guide roller 97 while the head 44 forms an image thereon. As stated above, the paper sheet 32 is sequentially transported linearly and vertically through the successive image forming units while being retained on the belt 94, it is prevented from being dislocated and, therefore, allows the images to be recorded thereon in register with one another. After all the images have been recorded on the paper sheet 32 by the individual image forming units, the paper sheet 32 is separated from the belt 94 by a separator or pawl 98 and, depending on the position of another selector 99, steered to the top tray 6a' or the side tray 6b'. The trays 6a' and 6b' may be formed integrally with or removably mounted on the casing 91. The upper end of the casing 91 is closed by a cover 100.

The electrostatic attraction used to transport a paper sheet 32 as stated above may be replaced with clamping means provided on a transport belt for clamping the leading edge of the sheet 32 or sucking means for sucking the sheet 32 onto the belt 94 by vacuum. In an ink jet printing system, if the temperature of a paper sheet is maintained constant, blotting of ink can be controlled to a certain range which insures high printing quality. Such a temperature lies in the range of 25° to 50° C. although it depends on the properties of ink. It is preferable to control the temperature by 2° to 5° C. within the above-mentioned range. For such temperature control, a heating body may be built in each guide roller 97, or the belt 94 may be implemented with a flexible planar heating body. Preferably, the heating body or the planar heating body should be constituted by a temperature self-regulating heating body whose resistance increases with the increase in temperature.

Figure 22:
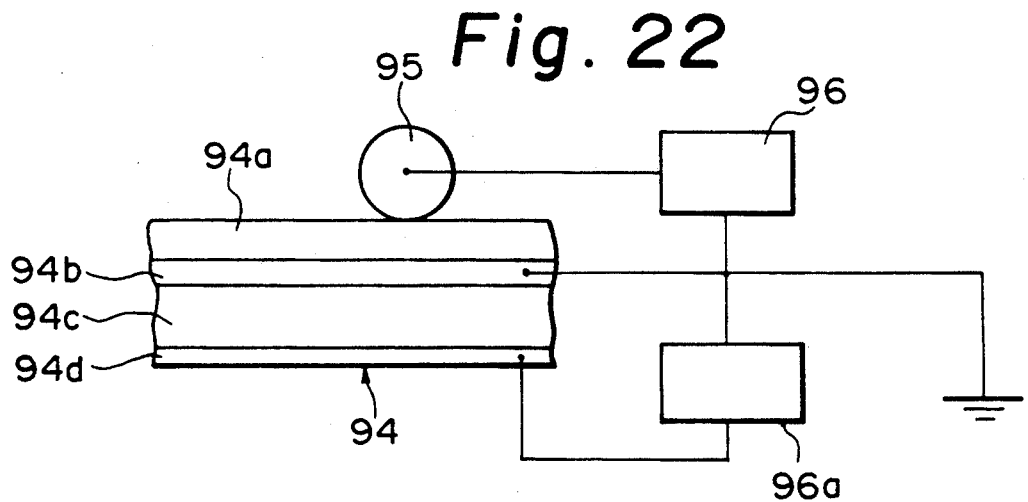
FIG. 22 is a section of a transport belt included in the transporting unit.

As shown in FIG. 22, the transport belt 94 comprises a laminate made up of an insulating film 94a, a first conductive layer 94b, a heating body 94 c, and a second conductive body 94d, the film 94a facing the paper sheet 32. The potential forming roller 95 is held in contact with the insulating film 94a. The voltage from the power source 96 is applied to between the film 94a and the conductive layer 94b to form the potential pattern for attraction. A voltage is applied from another power source 96a to between the first and second conductive layers 94b and 94d, whereby the heating body 94c having a positive characteristic to heat. As the temperature falls, the heating body 94c increases its resistance and thereby interrupts the current supply. This eliminates the need for a special control section.

Figure 23:
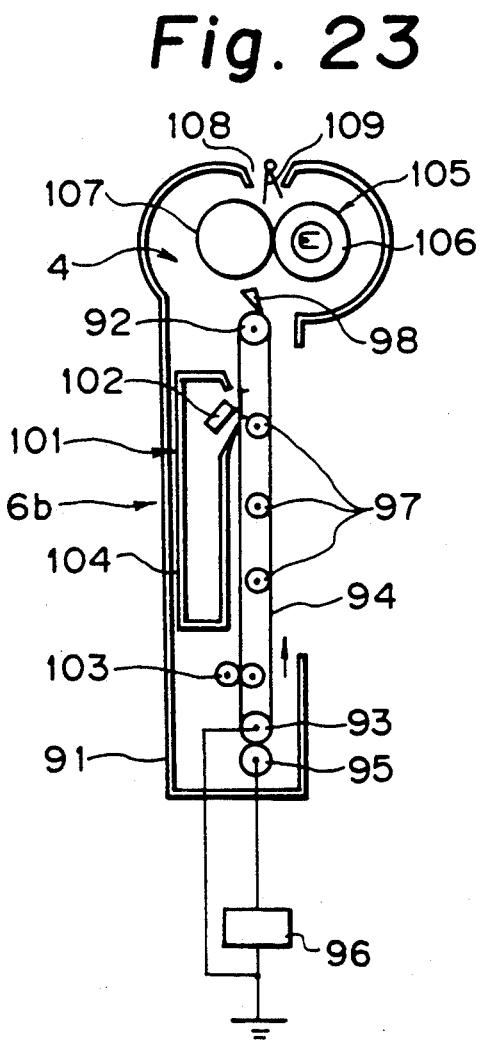
FIG. 23 is a section of a transporting and fixing unit.

When the image forming unit 3 adopts the electrophotographic system using a powdery developer as in FIGS. 11 and 20, a device for fixing toner images is essential. While the fixing device may be built in each image forming unit 3, a fixing operation is in many cases performed after all the image forming units 3 have completed image transfer. In such a case, the transporting and fixing unit 6b which is the combination of the transporting unit 6 and fixing unit 4 may be used, as shown in FIG. 23. The transporting and fixing unit 6b has a fixing device 105 disposed above and constructed integrally with the transporting unit 6, FIG. 21. The parts and elements of the transporting unit 6b identical with or corresponding to those shown in FIG. 21 are designated by the same reference numerals, and redundant description will be avoided for simplicity. The transport belt 94 is guided by the guide rollers 97 between the drive roller 92 and the driven roller 93. The guide rollers 97 each may play the role of the transfer roller 25' included in the image forming unit 3D. A power source for applying a voltage to the guide rollers or transfer rollers 25' may also be incorporated in the casing 91. The drive motor and various power sources are controlled by the CPU accommodated in the base unit 1.

In FIGS. 20 and 23, the paper sheet 32 fed out from the paper cassette of the paper feeding unit 2 by the feed roller 2a is transported by the belt 94 while being retained on the belt 94 due to the potential pattern formed by the roller 95. At the image transfer station of the image forming unit 3D, toner images are sequentially transferred from the belt 27 to the paper sheet 32. When the guide rollers 97 each serves the function of the transfer roller 25', the guide rollers 97 each is arranged such that it urges the transport belt 27 and paper sheet 32 against the first roller 24' of the associated image forming unit 3D with the intermediary of the belt 27. After all the image forming units 3D have completed image transfer, the paper sheet 32 is separated from the transport belt 94 by the separator 98 which is held in contact with the drive roller 92. The fixing device 105 has a heat roller 106 and a pressure roller 107 and fixes the toner image on the paper sheet 32 having been separated from the transport belt 94. The paper sheet 32 coming out of the fixing device 105 is driven out of the apparatus via an outlet 108. While the transporting and fixing unit 6b shown in FIG. 23 is an integral assembly of the transporting unit 6 and fixing device 105, the fixing device 105 may be constructed into an independent unit and mounted on the transporting unit 6.

After the paper sheet 32 has been separated from the transport belt 94, a cleaner 101 having a cleaning blade 102 cleans the surface of the belt 94, and then a discharge roller pair 103 or a discharge brush dissipates the charge on the belt 94. Thereupon, the roller 95 again forms a potential pattern on the transport belt 94. A container 104 may be associated with the cleaner 101 for collecting the toner and paper dust removed by the cleaning blade 102 from the transport belt 94. A selector or pawl 109 is located in the outlet 108 of the fixing device 105. When the top tray 6'a and side tray 6'b are formed integrally with or removably mounted on the casing 91, as shown in FIG. 21, the selector 109 is actuated to steer the paper sheet 32 to the top tray 6'a or the side tray 6'b.

Figure 24A:
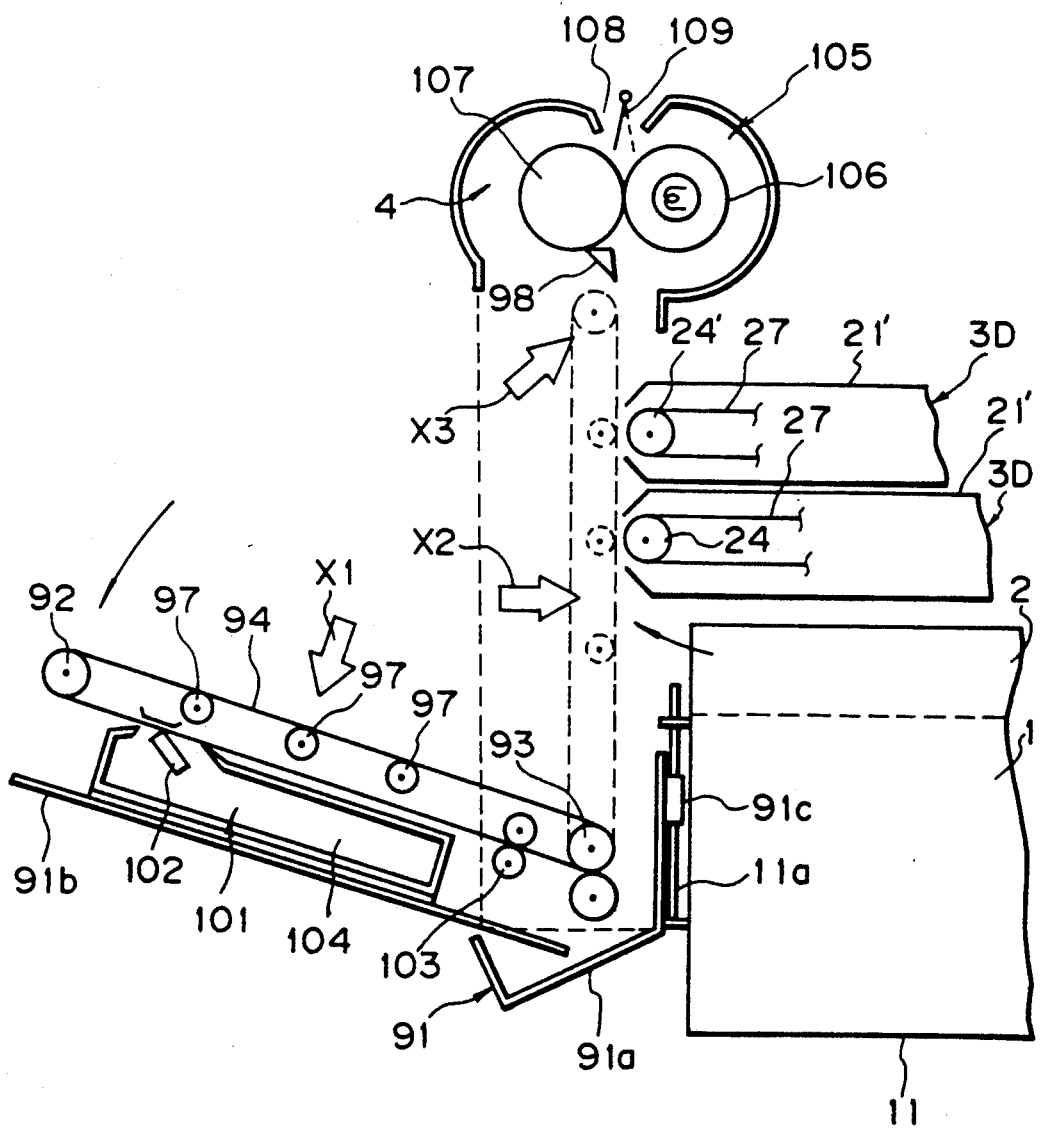
FIGS. 24A and 24B are sections showing a modification of the transporting and fixing unit of FIG. 23.
Figure 24B:
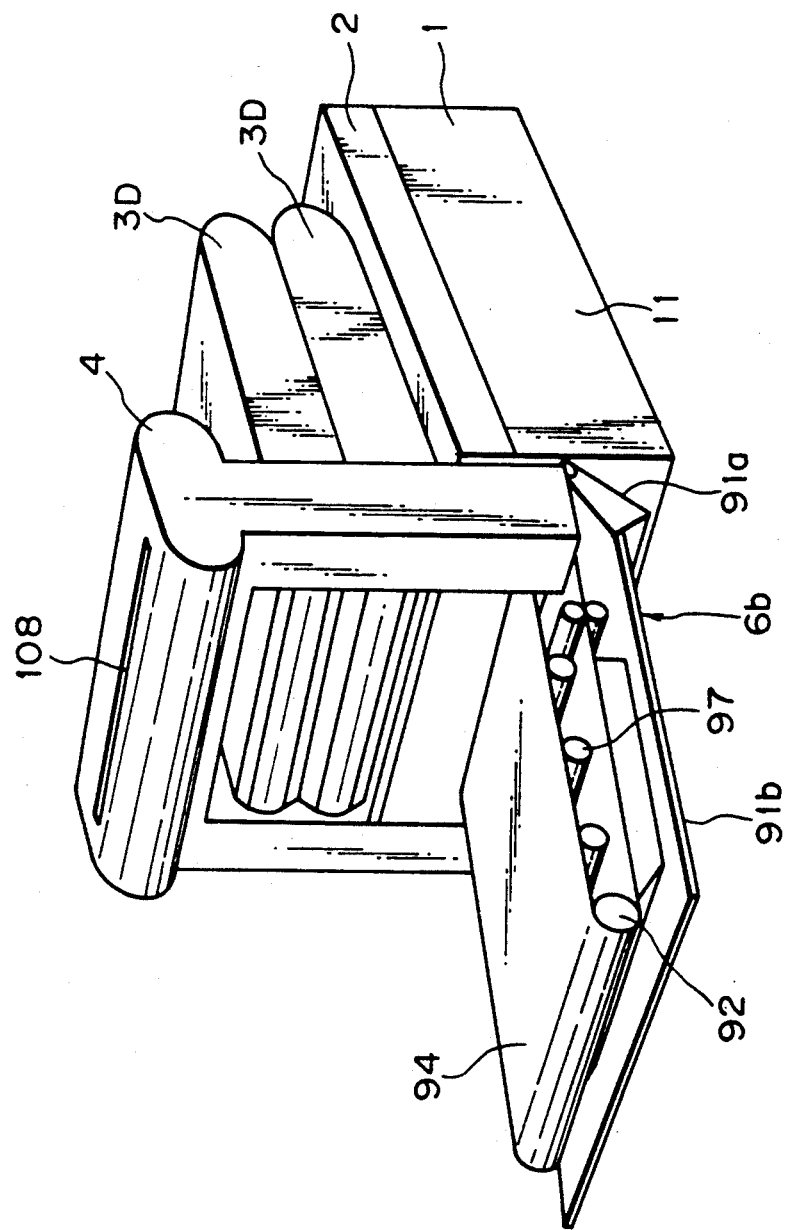

The length of the transport belt 94 is adequately selected such that it is operable with a stack of three or more image forming units 3. When only one image forming unit 3 is used, a part of the transport belt 94 may not face the unit 3 and may be used only to transport the paper sheet 32. To prevent the transporting unit 6 from transporting the paper sheet 32 more than necessary, the unit 6 may be mounted on the base unit 1 in a variable configuration. Specifically, as shown in FIGS. 24A and 24B, a guide rod 11a is mounted on the casing 11 of the base unit 1. A guide member such as a slidable ball bearing 91c is mounting on the casing 91 of the transporting and fixing unit 6b and slidably coupled over the guide rod 11a. The guide rod 11a and ball bearing 91c cooperate to guide the transporting and fixing unit 6b while the latter is moved up and down. When a plurality of, say, two or three image forming units 3D are stacked on the base unit 1, the top tray 6'a provided on the casing 91 of the unit 6b is loaded on the uppermost unit 3D. When only one image forming unit 3D is used, a stop, not shown, provided on the casing 11 of the base unit 1 positions the top tray 6'a so that the casing 91 may not project downward below the casing 11.

As shown in FIG. 24A, the transporting and fixing unit 6b may be modified to have a stationary casing 91a and a movable casing 91b. The slidable ball bearing 91c is mounted on the stationary casing 91a. The movable casing 91b is rotatably supported by the stationary casing 91b at the lower end thereof. In the specific construction shown in FIG. 24A, the movable casing 91b is movable about the axis of the driven roller 93 and loaded with the drive roller 92, motor for driving the roller 92, transport belt 94, guide rollers 97, cleaning blade 102, cleaner 101, discharge roller pair 103, and container 104. The fixing device 105 and selector 109 are mounted on the stationary casing 91a. When the movable casing 91b is held in an operative position indicated by a dashed line in the figure, the guide rollers 97 each abuts against respective one of the first rollers or transfer rollers 24' of the image forming units 3D with the intermediary of the image forming belt 27. In the event of a paper jam or inspection, the casing 91b is moved or opened away from the operative position to an inoperative position, as indicated by a solid line in the figure. Preferably, a knob is provided on the casing 91b to facilitate such opening and closing operations. Conversely, the movable casing 91b may be arranged to be movable about the axis of the drive roller 92 and to thereby uncover the lower part of the transporting unit 6b for inspection and other purposes. The openable casing 91b facilitates the removal of a paper sheet jamming a part of the path extending along the belt 94 (arrow X1), the outlet of the paper cassette of the paper feeding unit 2 (arrow X2), the fixing roller 106 (arrow X3), etc.

Figure 25:
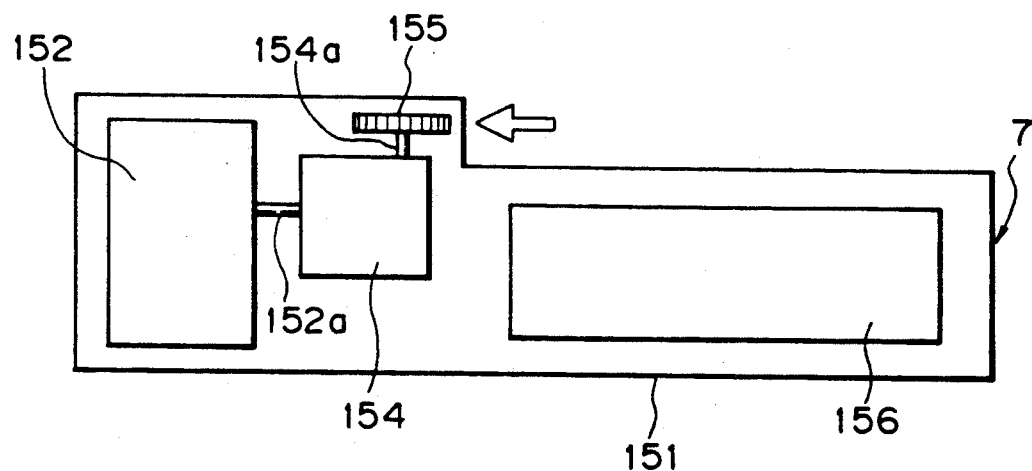
FIG. 25 is a transverse section of a gearing unit.
Figure 26:
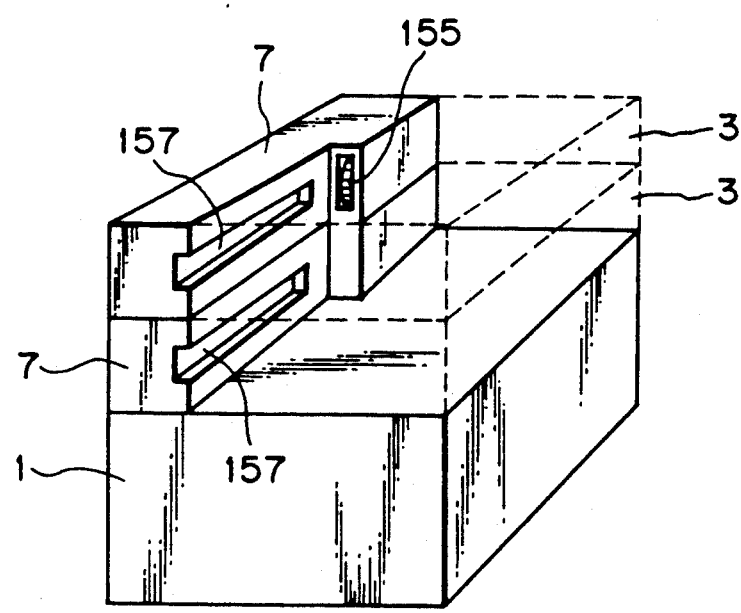
FIG. 26 is a perspective view showing two gearing units stacked on the base unit.

As shown in FIG. 25, the gearing unit 7 has a casing 151 accommodating a motor 152 and a speed reducing device 154 operatively connected to the output shaft 152a of the motor 152. A gear 155 is mounted on the output shaft 154a of the speed reducing device 154. When the gearing unit 7 is mounted on the image forming unit body 8, the gear 155 meshes with a gear that is disposed in the unit 8. A drive control device 156 is accommodated in the casing 151 and includes an electric circuit for operating the gearing unit 7. Solenoids and other elements are also included in the drive control device 156, as needed. As shown in FIG. 26 specifically, the casing 151 is provided with slide channels 157 to insure the positioning of the image forming unit body 8. The image forming unit body 8 has a lug or similar engaging portion to be slidably received in the channel 157. The gearing unit 7 has substantially the same height as the image forming unit 3 and can be combined with any desired image forming unit 3.

While a motor may be incorporated in the base unit 1 to simplify the structure, the load varies with the number of image forming units 3. Specifically, when a motor for driving all the image forming units 3 is accommodated in the base unit 1, it has to have a great capacity. When only one image forming unit 3 is used, a substantial part of such a capacity of the motor is wasted. The result is a disproportionately expensive, bulky and heavy apparatus. Moreover, it may occur that the capacity of the motor is short due to the use of an unexpectedly great number of image forming units 3. In the light of this, one gearing unit 7 should preferably be associated with each of the image forming unit body 8 and be provided with a motor whose capacity is just enough to drive one image forming unit body 8.

Two or more gearing units may be constructed into a single unit, if desired. Then, motors will be accommodated in a single casing and assigned one to each image forming unit, or a single motor will be used to operate associated image forming units. Of course, the output of the motor or motors may be selected in matching relation to the number of image forming units to drive. As shown in FIGS. 25 and 26, the casing 151 may be provided with a shoulder by taking account of the meshing of the gear 155 of the unit 7 with the gear of the image forming unit body 8. The shoulder will allow the gearing unit 7 and image forming unit 8 to be positioned and put together with ease. Further, some gearing units 7 matching the number of image forming unit bodies 8 to be combined which is often desired may be constructed into a single unit beforehand. For example, when three image forming unit bodies 8 are often connected together, three gearing units 7 may be constructed into a single unit beforehand.

Figure 27:
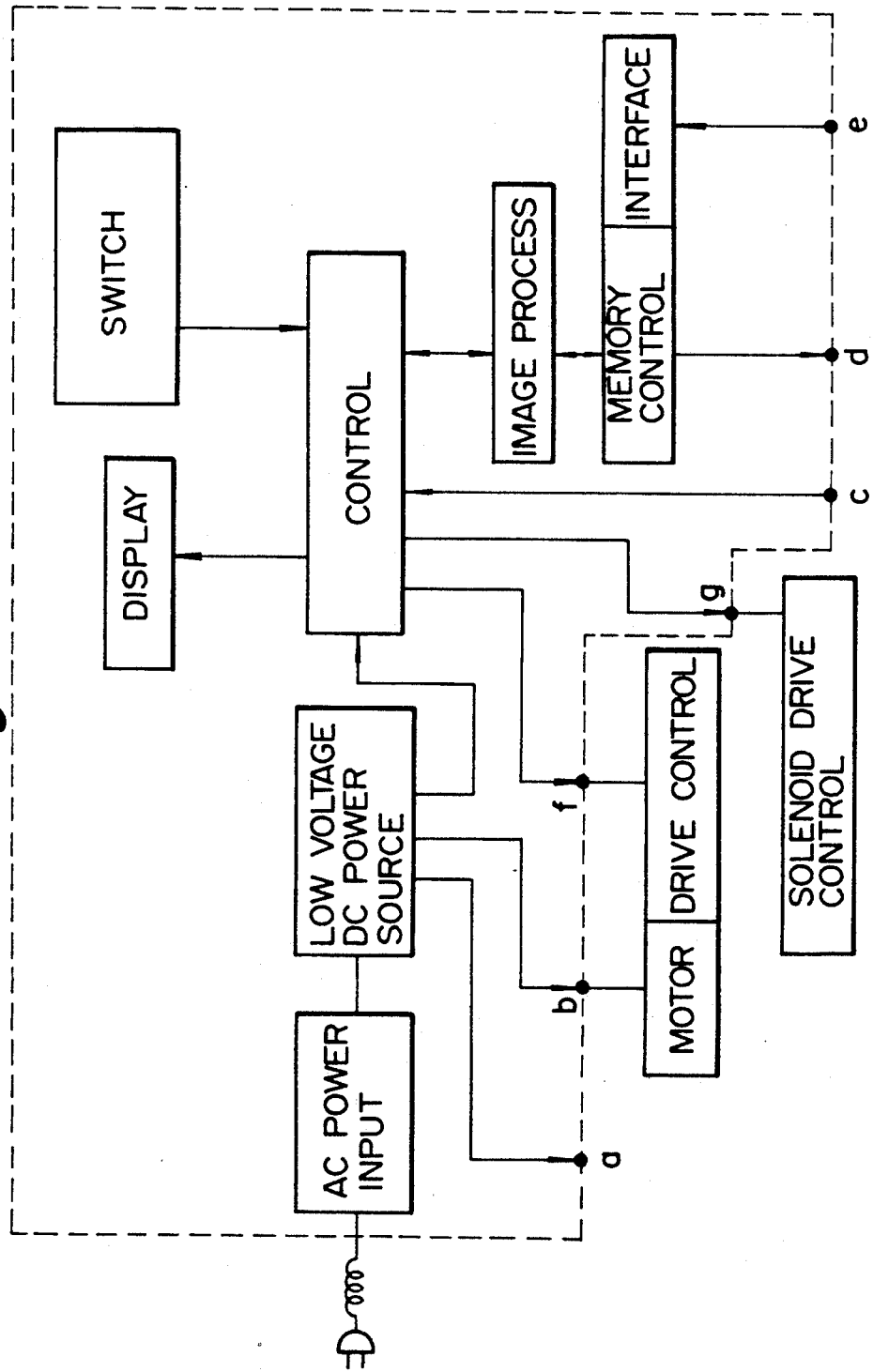
FIG. 27 is a block diagram schematically showing control circuitry for controlling the base unit and gearing unit when the gearing unit is subdivided.

When the gearing unit 7 is separated from the base unit 1 and accommodates a motor and other components therein, the control circuitry of the base unit 1 shown in FIG. 16 has to be modified, as shown in FIG. 27. In FIG. 27, the blocks surrounded by a dashed line are identical with those shown in FIG. 16. The motor and motor drive control circuit and the solenoid drive control circuit are accommodated in the gearing unit 7 and not in the base unit 1. The electric circuitry includes a sensor control circuit and other circuits in addition to the motor drive control circuit and solenoid drive control circuit.

Figure 28:
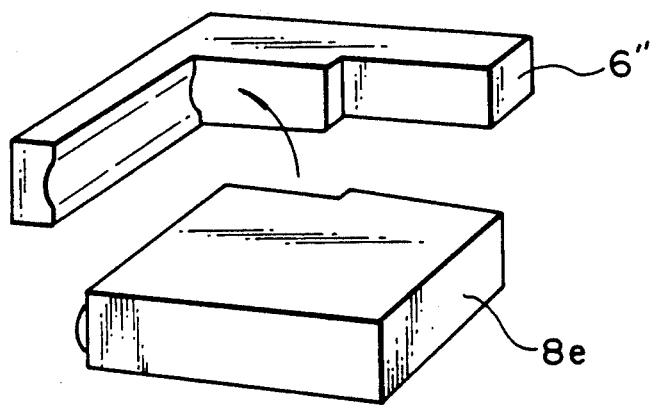
FIG. 28 is a perspective view showing a relation between a transporting and gearing unit and an image forming unit.
Figure 29:
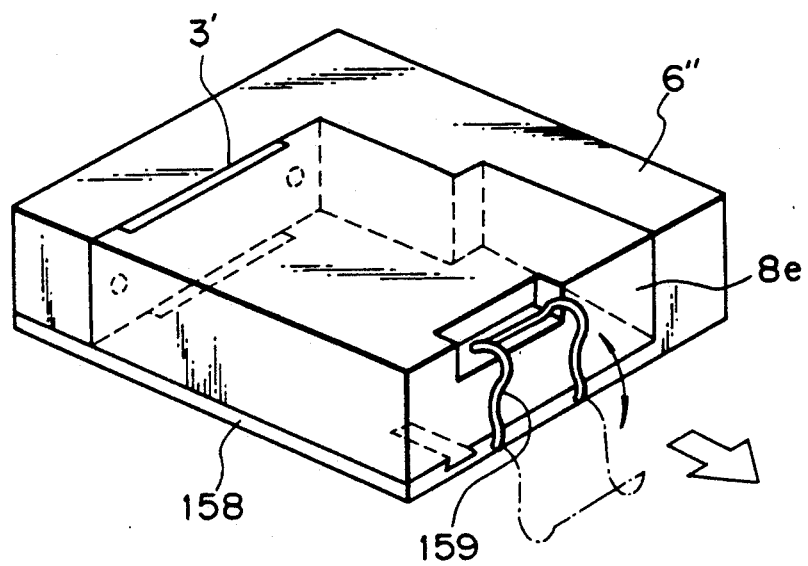
FIG. 29 is a perspective view showing the transporting and gearing unit and image forming unit in an assembled condition.

Although the gearing unit 7 is separated from the image forming unit body 8, it once combined with the image forming unit body 8 can be handled as if it were a part of the body 8, in the event of transport, assembly, inspection, etc. The gearing unit 7 may be so constructed as to drive rollers and other members which serve as transporting means incorporated in the image forming unit 3 or transporting means in the form of the transporting unit 6. When the gearing unit 7 drives the transporting means of the transporting unit 6 as mentioned, the transporting unit 6 and gearing unit 7 may be constructed into a single transporting and gearing unit 6″, as shown in FIGS. 28 and 29. The transporting and gearing unit 6″ has only to be mounted on an image forming unit body 8e. In this case, the image forming unit 3 may be of the type using the thermal printing system, ink jet printing system, or electrophotographic system. As shown in FIG. 29, the transporting and gearing unit 6″ may be provided with a flat plate 158 having a clamping member 159. Then, after the image forming unit body 8e has been mounted on the flat plate 158, the clamping member 159 is brought to a position for clamping the unit body 8e. These unit 6″ and unit body 8e are positioned relative to each other by use of, for example, a pin and hole arrangement or shoulders of casings which are configured by taking account of the meshing of gears. A passage 3′ for the paper sheet 32 is defined between the unit 6″ and the unit body 8e. The plate 158 is also formed with an opening so as not to interfere with the passage of the paper sheet 32.

Figure 30A:
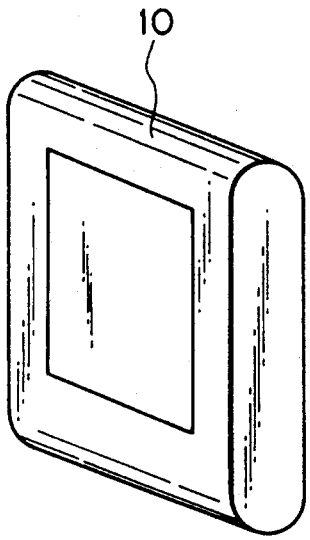
FIG. 30A is an external perspective view showing a display unit.
Figure 30B:
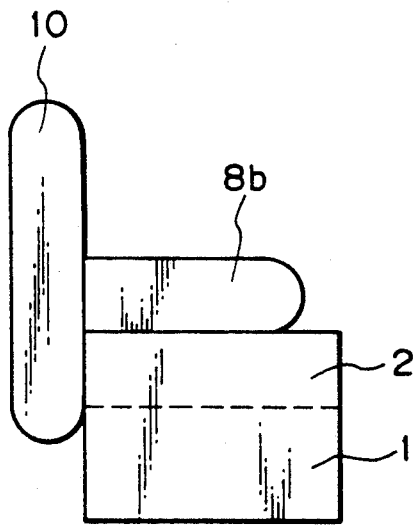
FIGS. 30B to 30F are views each showing a specific combination of units including the display unit.
Figure 30C:
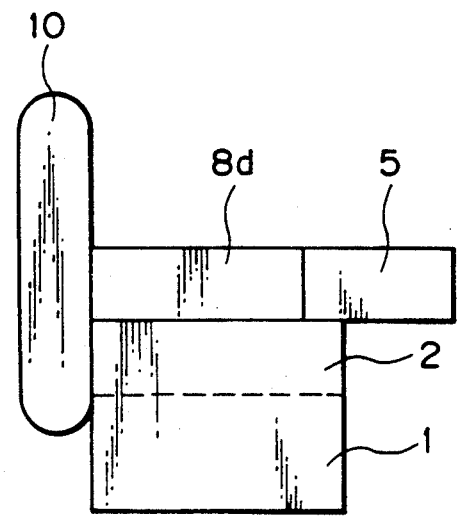
Figure 30D:
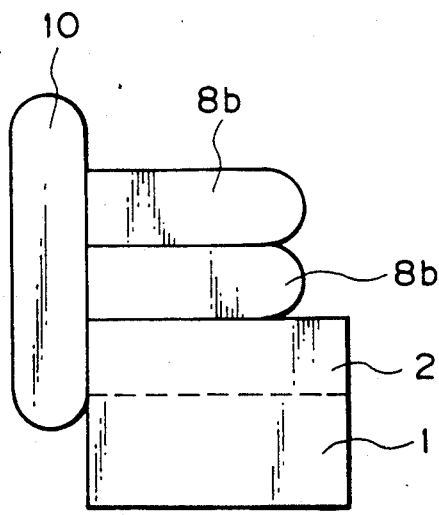
Figure 30E:
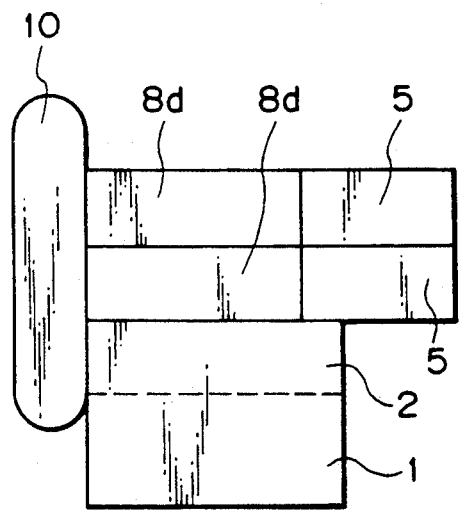
Figure 30F:
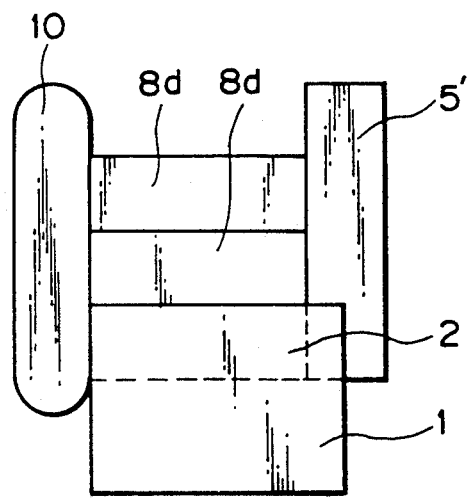

The image recording apparatuses shown in FIGS. 7A to 7N and each having any of the transporting units 6 described above as the image receiving unit are of the type recording an image on a paper sheet (as the image receiving element) being transported by the unit 6 by the image forming unit 3. Apart from this type of apparatus, there may be contemplated an apparatus which does not use paper sheets and displays an image on a display. Such an alternative type of apparatus can be implemented if the apparatuses shown in FIGS. 7A to 7N are modified. Specifically, a display unit 10 shown in FIG. 30A is added to the base unit 1, paper feeding unit 2, image forming unit 3, etc. (as an image receiving unit). The display unit 10 may be substituted for the transporting unit 6A or 6B shown in any of FIGS. 7J to 7N. The transporting unit 6 serves to transport a paper sheet, while the display unit 10 serves to display an image and is, therefore, effective even when one image forming unit 3 is used. Hence, the display unit 10 is usable with a single image forming unit body 8b or 8d, as shown in FIGS. 30B or 30C, or even with two or more image forming unit bodies 8b or 8d, as shown in any of FIGS. 30D to 30F. The configurations shown in FIGS. 30B and 30C are modifications of the combinations A-1 and A-1a shown in FIGS. 7A and 7C, respectively. When two or more image forming unit bodies 8b or 8d are used, the configuration shown in FIG. 30D which is a modification of the combination A-1′, FIG. 7E, or the configuration shown in FIG. 30E which is a modification of the combination A-1′a, FIG. 7G, is usable. FIG. 30F is a modification of any one of the configurations shown in FIGS. 7G to 7I.

Figure 31:
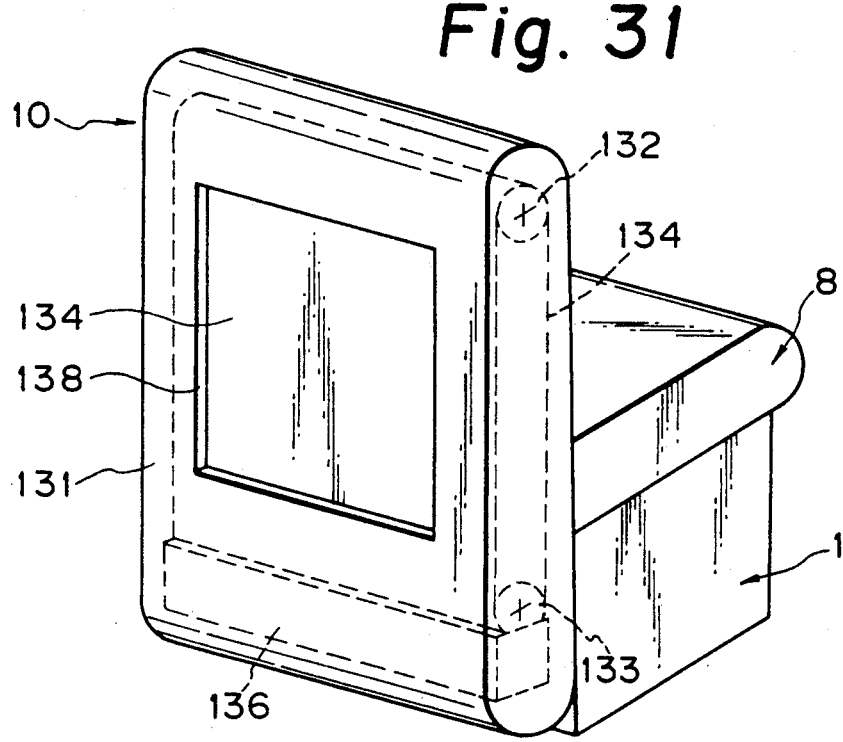
FIG. 31 is an external perspective view showing a specific assembly of the display unit and other units.
Figure 32:
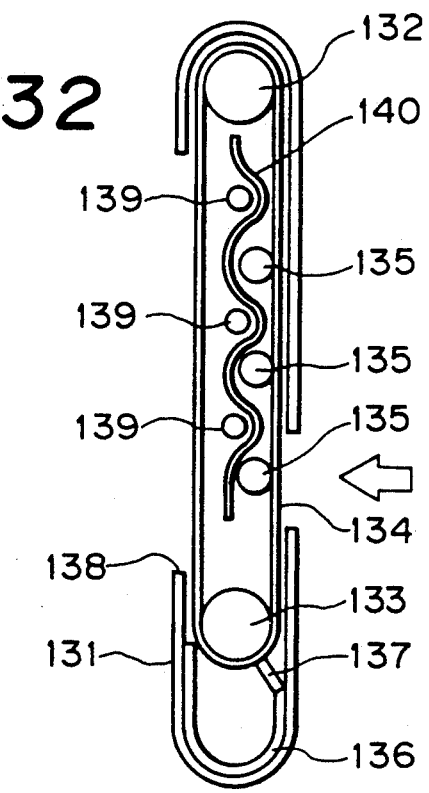
FIG. 32 is a section of the display unit.

As shown in FIGS. 31 and 32, the display unit 10 has a casing 131 and a drive roller 132 and a driven roller 133 which are accommodated in the casing 131. A white transfer belt 134 made of a dielectric material forms an image receiving element and is passed over the drive and driven rollers 132 and 133. A motor, not shown, may also be disposed in the casing 131 for driving the drive roller 132. The transfer belt 134 is guided by guide rollers 135 between the drive and driven rollers 132 and 133. The guide rollers 135 each may serve as a transfer roller to allow associated one of the image forming unit bodies 8 to directly transfer an image to the transfer belt 134. The casing 131 is securely connectable to the base unit 1 or the image forming unit body 8. Openings are formed through those portions of the casing 131 which face the individual image forming unit bodies 8, so that the transfer belt 134 may directly face the image forming unit bodies 8. Among such openings, those which do no join in the image transfer are closed by lids. A cleaner 136 is disposed in the casing 131 and has a blade 137. The blade 137 is held in contact with the transfer belt 134 to clean the surface of the belt 134.

The casing 131 has a window 138 at the opposite side to the image forming unit body 8, so that an image printed on the transfer belt 134 may be visible. To facilitate the observation of the image on the belt 134, a lamp or similar illuminating device 139 is accommodated in the casing 131. A screen 140 prevents the lamp 139 from irradiating the portion of the transfer belt 134 that faces the image forming unit body 8. If desired, a display may be disposed in the window 138 to allow a person to see an image projected thereon in place of the image printed of the transfer belt 134. The display may be implemented with liquid crystal which is responsive to an electric image signal. When the operator observes an image formed on the transfer belt 134 through the window 138, it is possible for the belt 134 to be moved automatically by a predetermined distance at a time and at a predetermined interval either by the operator or by the control circuitry which has a program. The image on the belt 134 observed through the window 138 is erased by the cleaner 136 to be replaced with another image. The display unit 10 may be fixed in place relative to the base unit 1. The image recording apparatus using the display unit 10 does not have to transport paper sheets and, therefore, eliminates the need for electrostatic attraction.

While the display unit 10 is shown in FIGS. 30A to 30F, 31 and 32 as being bodily replaceable with the transporting unit 6, it may be constructed to serve as the transporting unit 10 as well. Then, a cover may advantageously close the window 138 when the display unit 10 serves as a transporting unit. In a paper transport mode, the means for forming a potential pattern on the transport belt is activated while, in a display mode, it is deactivated and, instead, the cleaner is activated.

Figure 33:
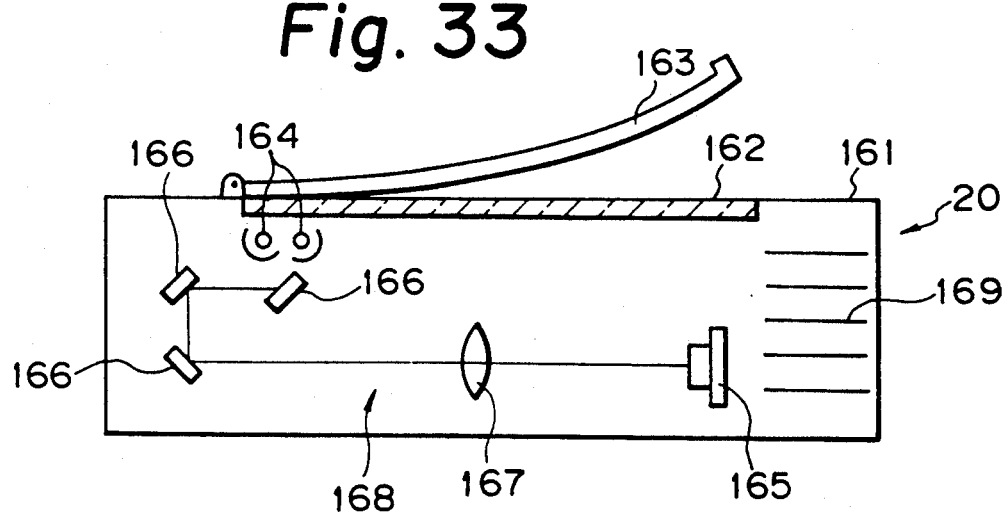
FIG. 33 is a view showing a specific construction of a reading unit.

FIG. 33 shows a reading unit applicable to the present invention. As shown, the reading unit, generally 20, has a casing 161 which has a glass platen 161 and a cover plate 163 on the top thereof. A light source 164 for illuminating a document, optics 168 including mirrors 166 and a lens 167 for steering an imagewise reflection from the document to an imaging device such as a CCD array 165, and a circuit board 169 associated with the imaging device 165 are accommodated in the casing 161. A book or similar relatively thick document may be laid on the glass platen 162 and pressed from above by the cover plate 163. The reading unit 20 produces signals undergone color separation. These signals are applied to the individual image forming units 3 to cause the latter to write images in synchronism with the movement of a paper sheet. The cover plate 163 may be replaced with an automatic document feeder (ADF) for reading documents which are automatically fed one after another. The reading unit 20 may be mounted on the image forming unit 3. Alternatively, the reading unit 20 may be mounted on an exclusive support frame, and a single device including the base unit 1 with a printing function and image forming unit 3 may be removably connected to the reading unit 20.

Figure 34:
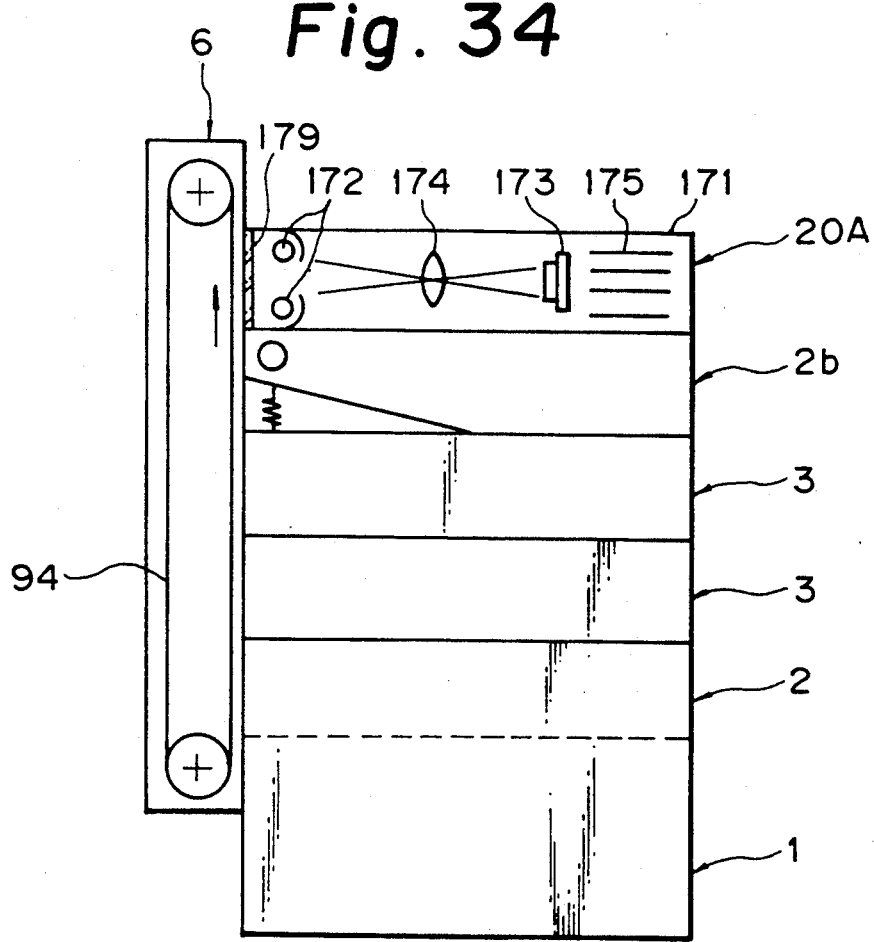
FIG. 34 is a view showing an image recording apparatus including a modified form of the reading unit shown in FIG. 33.

FIG. 34 shows a modified form of the reading unit 20. As shown, a plurality of (two in the figure) image forming units 3 are stacked on or arranged side by side beside the paper feeding unit 2. The paper cassette 2b is connected to the uppermost or the outermost image forming unit 3, and the modified reading unit 20A is mounted on or positioned beside the paper cassette 2b. The image forming units 3 and reading unit 20A may transport paper sheets and documents by transport rollers incorporated therein. Alternatively, a single transporting unit 6 may be located to face and operatively connected to the units 3 and 20A in order to insure smooth and accurate paper transport. As shown in the figure, the reading unit 20A has a casing 171 having a glass plate 179 which a document contacts. The glass plate or glass platen 179 is mounted on one lateral end of the casing 171, so that the unit 20A may read a document fed from the units 3 and 2 while the latter is in movement. The casing 171 has thereinside a lamp 172 for illuminating a document through the glass platen 179, optics 174 for focusing a reflection from the document onto a CCD array or similar imaging device 173, and a circuit board 175 associated with the imaging device 173.

In summary, it will be seen that the present invention achieves various unprecedented advantages, as enumerated below.

(1) Since various components are constructed into fully modular units, an image recording apparatus for executing a particular image forming principle can be constructed by combining the units in any desired configuration.

(2) Since the individual units are connected together by external arrangements, they can be readily combined to constitute a desired type of image forming apparatus within a short period of time.

(3) The external arrangements interconnecting the units prevent the operator from operating the apparatus without mounting necessary units.

(4) The operator can immediately see the kind of image recording operations available with the interconnected units. simply by looking at the external configuration of the units.

(5) A plurality of paper feeding units and image forming units, whether they be the same or different in kind, can be combined together in an operative configuration and can be selectively used.

(6) A display unit may be added to provide an image forming apparatus with both of an image recording function and an image displaying function.

(7) Higher image quality, higher recording speed, lighter weight, easier maintenance and greater space saving are achievable, as desired.

Various modifications will become possible for those skilled in the art after receiving the teachings of the present disclosure without departing from the scope thereof.

What is claimed is:

1. An image recording apparatus constituted by components each being constructed as an independent, stackable, modular unit, comprising:
   a base unit comprising a single casing accommodating at least an electric control device;
   at least one image forming unit comprising a single casing accommodating image processing means for forming an image in response to an image signal which is representative of an image to be recorded, said image forming unit casing having an end opening and said image processing means being positioned adjacent said end opening such that an image may be formed on an image receiving element covering said opening;
   an image receiving unit removably mounted to the base unit and comprising means for linearly transporting an image receiving element in a vertical direction so as to cover the opening and have an image formed thereto;
   said image forming unit being removably externally mounted to said base unit and operated by said electric control device of said base unit, wherein each said at least one image forming unit lacks means for transporting said image receiving element.

2. The image recording apparatus of claim 1, wherein said image receiving unit comprises a paper transporting unit for transporting a paper sheet as said image receiving element.

3. The image recording apparatus of claim 1 including a frame, wherein said base unit, said image forming unit and said image receiving unit are held together by said frame.

4. The image recording apparatus of claim 1, wherein said image receiving unit comprises a display unit having a movable display element.

5. The image recording apparatus of claim 1 including a document reading unit having a window at an end thereof, said window being positioned to read an image from said image receiving unit, whereby said image receiving unit may be used for document feeding.

6. The image recording apparatus of claim 5 including a document feeding unit disposed between said image forming unit said document reading unit.

7. The image recording apparatus of claim 2, wherein said paper transporting unit has a paper inlet and a paper outlet.

8. An image recording apparatus constituted by components each being constructed as an independent, stackable, modular unit, comprising:

a base unit comprising a single casing accommodating at least an electric control device;

a plurality of image forming units vertically stacked on one another, each comprising a single casing accommodating image processing means for forming an image in response to an image signal which is representative of an image to be recorded, said image forming unit casing having an end opening and said image processing means being positioned adjacent said end opening such that an image may be formed on an image receiving element covering said opening;

an image receiving unit removably mounted to the base unit an comprising means for linearly transporting an image receiving element in a vertical direction so as to sequentially cover the opening of each of said stacked image forming units and have an image formed thereto;

said image forming units being removably externally mounted to said base unit and operated by said electric control device of said base unit.

9. The image recording apparatus of claim 8, wherein said image receiving unit comprises a paper transporting unit for transporting a paper sheet as said image receiving element.

10. The image recording apparatus of claim 8 including a frame, wherein said base unit, said image forming units and said image receiving unit are held together by said frame.

11. The image recording apparatus of claim 8, wherein said image receiving unit comprises a display unit having a movable display element.

12. The image recording apparatus of claim 8 including a document reading unit having a window at an end thereof, said window being positioned to read an image from said image receiving unit, whereby said image receiving unit may be used for document feeding.

13. The image recording apparatus of claim 12 including a document feeding unit disposed between said image forming units said document reading unit.

14. The image recording apparatus of claim 9, wherein said paper transporting unit has a paper inlet and a paper outlet.

* * * * *